US012159590B2

(12) United States Patent
Yuan et al.

(10) Patent No.: US 12,159,590 B2
(45) Date of Patent: Dec. 3, 2024

(54) VOLTAGE SUPPLY CIRCUIT FOR OUTPUTTING DRIVING VOLTAGE TO PIXEL CIRCUITS

(71) Applicants: Hefei BOE Joint Technology Co., Ltd., Anhui (CN); BOE Technology Group Co., Ltd., Beijing (CN)

(72) Inventors: Zhidong Yuan, Beijing (CN); Yongqian Li, Beijing (CN); Can Yuan, Beijing (CN)

(73) Assignees: HEFEI BOE JOINT TECHNOLOGY CO., LTD., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/016,903

(22) PCT Filed: Jan. 27, 2022

(86) PCT No.: PCT/CN2022/074227
§ 371 (c)(1),
(2) Date: Jan. 19, 2023

(87) PCT Pub. No.: WO2023/141862
PCT Pub. Date: Aug. 3, 2023

(65) Prior Publication Data
US 2024/0135882 A1 Apr. 25, 2024

(51) Int. Cl.
*G09G 3/3258* (2016.01)

(52) U.S. Cl.
CPC .................................. *G09G 3/3258* (2013.01)

(58) Field of Classification Search
CPC .................................................... G09G 3/3258
USPC ........................................................... 345/55
See application file for complete search history.

(56) References Cited

U.S. PATENT DOCUMENTS

| | | | | |
|---|---|---|---|---|
| 5,457,416 | A | 10/1995 | Song et al. | |
| 2017/0243546 | A1* | 8/2017 | Ono | G09G 3/3233 |
| 2018/0130407 | A1 | 5/2018 | Zhai | |
| 2018/0211716 | A1* | 7/2018 | Ma | G11C 19/28 |

(Continued)

FOREIGN PATENT DOCUMENTS

| | | | |
|---|---|---|---|
| CN | 107657918 | A | 2/2018 |
| CN | 110189681 | A | 8/2019 |

(Continued)

*Primary Examiner* — Long D Pham
(74) *Attorney, Agent, or Firm* — WHDA, LLP

(57) ABSTRACT

A voltage supply circuit, a voltage supply method, a voltage supply module and a display device are provided. The voltage supply circuit includes a first node control circuit, a first control node control circuit, a second node control circuit and a driving voltage output circuit. The first node control circuit controls a potential of the first node; the first control node control circuit controls the potential of the first control node; the second node control circuit controls a potential of the second node; the driving voltage output circuit is electrically connected to the second node, the driving voltage output terminal and the initial voltage terminal respectively, and is configured to control the driving voltage output terminal to output a driving voltage according to the initial voltage provided by the initial voltage terminal under the control of the potential of the second node.

20 Claims, 16 Drawing Sheets

(56) References Cited

U.S. PATENT DOCUMENTS

| | | | | |
|---|---|---|---|---|
| 2020/0251044 | A1* | 8/2020 | Lin | H03K 19/0019 |
| 2020/0394960 | A1* | 12/2020 | Yuan | G09G 3/3266 |

FOREIGN PATENT DOCUMENTS

| | | | |
|---|---|---|---|
| CN | 113421528 | A | 9/2021 |
| CN | 113436585 | A | 9/2021 |

* cited by examiner

VOLTAGE SUPPLY CIRCUIT FOR OUTPUTTING DRIVING VOLTAGE TO PIXEL CIRCUITS

CROSS-REFERENCE TO RELATED APPLICATION

This application is the U.S. national phase of PCT Application No. PCT/CN2022/074227 filed on Jan. 27, 2022, which is incorporated herein by reference in its entirety.

TECHNICAL FIELD

The present disclosure relates to the field of display technology, in particular to a voltage supply circuit, a voltage supply method, a voltage supply module and a display device.

BACKGROUND

In the related art, a simple pixel circuit capable of realizing an internal compensation function cannot be provided, and a voltage supply circuit cannot be provided to conveniently provide a driving voltage for the pixel circuit. The conventional display device is not conducive to realizing simplified pixel structure and high pixel density (PPI).

SUMMARY

In one aspect, the present disclosure provides in some embodiments a voltage supply circuit, including a first node control circuit, a first control node control circuit, a second node control circuit and a driving voltage output circuit, wherein, the first node control circuit is electrically connected to a first node, an input terminal, a first clock signal terminal, a first control node, a first voltage terminal and a second voltage terminal, and is configured to control a potential of the first node according to a first voltage signal provided by the first voltage terminal and a second voltage signal provided by the second voltage terminal under the control of an input signal provided by the input terminal, a first clock signal provided by the first clock signal terminal and a potential of the first control node; the first control node control circuit is electrically connected to the first control node, the input terminal and a second clock signal terminal respectively, is configured to control a potential of the first control node under the control of a second clock signal provided by the second clock signal terminal and the input signal; the second node control circuit is electrically connected to a second node, the first control node, the first clock signal terminal, the first node and the second voltage terminal respectively, is configured to control a potential of the second node according to the first clock signal and the second voltage signal under the control of the potential of the first node, the potential of the first control node and the first clock signal; the driving voltage output circuit is electrically connected to the second node, the driving voltage output terminal and the initial voltage terminal respectively, and is configured to control the driving voltage output terminal to output a driving voltage according to an initial voltage provided by the initial voltage terminal under the control of the potential of the second node.

Optionally, the driving voltage output circuit is further electrically connected to the first node and the third voltage terminal, is configured to control the driving voltage output terminal to be electrically connected to the third voltage terminal under the control of the potential of the first node.

Optionally, the voltage supply circuit further includes a carry signal output circuit; wherein the carry signal output circuit is respectively electrically connected to the carry signal output terminal, the first node, the second node, the first voltage terminal and the second voltage terminal, is configured to control the carry signal output terminal to output a carry signal according to the first voltage signal and the second voltage signal under the control of the potential of the first node and the potential of the second node.

Optionally, the first node control circuit includes a second control node control sub-circuit, a first node control sub-circuit and a first energy storage circuit; the second control node control sub-circuit is electrically connected to the second control node, the input terminal and the first clock signal output terminal, and is configured to control to connect the second control node and the input terminal under the control of the first clock signal; a first end of the first energy storage circuit is electrically connected to the second control node, a second end of the first energy storage circuit is electrically connected to the first node, and the first energy storage circuit is used for store electrical energy; the first node control sub-circuit is electrically connected to the second control node, the first node, the first voltage terminal, the first clock signal terminal, the first control node and the second voltage terminal, respectively, is configured to control to connect the first node and the first voltage terminal under the control of the potential of the second control node, and control to connect the first node and the second voltage terminal under the control of the first clock signal and the potential of the first control node.

Optionally, the first node control circuit comprises a first transistor, a second transistor, a third transistor and a fourth transistor; a control electrode of the first transistor is electrically connected to the input terminal, a first electrode of the first transistor is electrically connected to the first voltage terminal, and a second electrode of the first transistor is electrically connected to a first electrode of the second transistor; a control electrode of the second transistor is electrically connected to the first clock signal terminal, and a second electrode of the second transistor is electrically connected to the first node; a control electrode of the third transistor is electrically connected to the first clock signal terminal, a first electrode of the third transistor is electrically connected to the first node, and a second electrode of the third transistor is electrically connected to a first electrode of the fourth transistor; a control electrode of the fourth transistor is electrically connected to the first control node, and a second electrode of the fourth transistor is electrically connected to the second voltage terminal.

Optionally, the first node control circuit further comprises a fifth transistor; the second electrode of the second transistor and the first electrode of the third transistor are electrically connected to the first node through the fifth transistor; a control electrode of the fifth transistor is electrically connected to the first voltage terminal, and a first electrode of the fifth transistor is electrically connected to the second electrode of the second transistor and the first electrode of the third transistor respectively, a second electrode of the fifth transistor is electrically connected to the first node.

Optionally, the second control node control sub-circuit comprises a first transistor; a control electrode of the first transistor is electrically connected to the first clock signal terminal, a first electrode of the first transistor is electrically connected to the input terminal, and a second electrode of the first transistor is electrically connected to the second control node; the first energy storage circuit includes a first capacitor; a first end of the first capacitor is electrically connected to the second control node, and a second end of the first capacitor is electrically connected to the first node; the first node control sub-circuit includes a second transistor, a third transistor and a fourth transistor; a control electrode of the second transistor is electrically connected to the second control node, a first electrode of the second transistor is electrically connected to the first voltage terminal, and a second electrode of the second transistor is electrically connected to the first node; a control electrode of the third transistor is electrically connected to the first clock signal terminal, a first electrode of the third transistor is electrically connected to the first node, and a second electrode of the third transistor is electrically connected to a first electrode of the fourth transistor; a control electrode of the fourth transistor is electrically connected to the first control node, and a second electrode of the fourth transistor is electrically connected to the second voltage terminal.

Optionally, the first node control sub-circuit further comprises a fifth transistor; the second electrode of the second transistor and the first electrode of the third transistor are electrically connected to the first node through the fifth transistor; a control electrode of the fifth transistor is electrically connected to the first voltage terminal, a first electrode of the fifth transistor is electrically connected to the second electrode of the second transistor and the first electrode of the third transistor respectively, a second electrode of the fifth transistor is electrically connected to the first node.

Optionally, the first control node control circuit comprises a sixth transistor and a seventh transistor; a control electrode of the sixth transistor is electrically connected to the second clock signal terminal, a first electrode of the sixth transistor is electrically connected to the first voltage terminal or the second clock signal terminal, and a second electrode of the sixth transistor is electrically connected to the first control node; a control electrode of the seventh transistor is electrically connected to the input terminal, a first electrode of the seventh transistor is electrically connected to the first control node, and a second electrode of the seventh transistor is electrically connected to the second clock signal terminal.

Optionally, the second node control circuit comprises an eighth transistor, a ninth transistor, a second capacitor and a tenth transistor, a control electrode of the eighth transistor is electrically connected to the first control node, a first electrode of the eighth transistor is electrically connected to the first clock signal terminal, and a second electrode of the eighth transistor is electrically connected to a first electrode of the ninth transistor; a first end of the second capacitor is electrically connected to the first control node, and a second end of the second capacitor is electrically connected to the first electrode of the ninth transistor; a control electrode of the ninth transistor is electrically connected to the first clock signal terminal, and a second electrode of the ninth transistor is electrically connected to the second node; a control electrode of the tenth transistor is electrically connected to the first node, a first electrode of the tenth transistor is electrically connected to the second node, and a second electrode of the tenth transistor is electrically connected to the second voltage terminal.

Optionally, the second node control circuit further comprises a third capacitor; a first end of the third capacitor is electrically connected to the second node, and a second end of the third capacitor is electrically connected to the second voltage terminal.

Optionally, the carry signal output circuit comprises an eleventh transistor, a twelfth transistor and a fourth capacitor; a control electrode of the eleventh transistor is electrically connected to the first node, a first electrode of the eleventh transistor is electrically connected to the first voltage terminal, and a second electrode of the eleventh transistor is electrically connected to the carry signal output terminal; a control electrode of the twelfth transistor is electrically connected to the second node, a first electrode of the twelfth transistor is electrically connected to the carry signal output terminal, and a second electrode of the twelfth transistor is electrically connected to the second voltage terminal.

Optionally, the driving voltage output circuit comprises a thirteenth transistor; a control electrode of the thirteenth transistor is electrically connected to the second node, a first electrode of the thirteenth transistor is electrically connected to the driving voltage output terminal, and s second electrode of the thirteenth transistor is electrically connected to the initial voltage terminal.

Optionally, the driving voltage output circuit comprises a thirteenth transistor, a fourteenth transistor and a fourth capacitor; a control electrode of the fourteenth transistor is electrically connected to the first node, a first electrode of the fourteenth transistor is electrically connected to the third voltage terminal, and a second electrode of the fourteenth transistor is electrically connected to the driving voltage output terminal; a control electrode of the thirteenth transistor is electrically connected to the second node, a first electrode of the thirteenth transistor is electrically connected to the driving voltage output terminal, and a second electrode of the thirteenth transistor is electrically connected to the initial voltage terminal; a first end of the fourth capacitor is electrically connected to the first node, and a second end of the fourth capacitor is electrically connected to the driving voltage output terminal.

In a second aspect, a voltage supply method is applied to the voltage supply circuit, wherein a voltage supply period includes a first phase, a second phase, a third phase, a fourth phase and a fifth phase that are set successively; the voltage providing method includes: in the first phase, the first node control circuit controlling the potential of the first node to be a first level, the first control node control circuit controlling the potential of the first control node to be the first level, and the second node control circuit controlling the potential of the second node to be a second level; in the second phase, the first node control circuit controlling the potential of the first node to be the second level, the first control node control circuit controlling the potential of the first control node to be the first level, the second node control circuit controlling the potential of the second node to be the first level, and the driving voltage output circuit controlling the driving voltage output terminal to output the initial voltage under the control of the potential of the second node; in the third phase, the first node control circuit controlling the potential of the first node to be the second level, the first control node control circuit controlling the potential of the first control node to be the first level, the second node control circuit controlling the potential of the second node to be the first level, and the driving voltage output circuit controlling the driving voltage output terminal to output the initial voltage under the control of the potential of the second node; in the fourth phase, the first node control circuit controlling the potential of the first node to be the second level, the first control node control circuit controlling the potential of the first control node to be the second level, the second node control circuit controlling the potential of the second node to be the first level, and the driving voltage output circuit controlling the driving voltage output terminal to output the initial voltage under the control of the potential of the second node; in the fifth phase, the first node control circuit controlling the potential of the first node to be the first level, the first control node control circuit controlling the potential of the first control node, and the second node control circuit controlling the potential of the second node to be the second level.

Optionally, the driving voltage output circuit is further electrically connected to the first node and the third voltage terminal, and the voltage supply method further includes: in the first phase and the fifth phase, the driving voltage output circuit controlling to connect the driving voltage output terminal and the third voltage terminal under the control of the potential of the first node.

Optionally, the voltage supply circuit further comprises a carry signal output circuit; the voltage supply method further includes: in the first phase and the fifth phase, the carry signal output circuit controlling to connect the carry signal output terminal and the first voltage terminal under the control of the potential of the first node; in the second phase, the third phase and the fourth phase, the carry signal output circuit controlling to connect the carry signal output terminal and the second voltage terminal under the control of the potential of the second node.

In a third aspect, a voltage supply module includes a plurality of stages of voltage supply circuits, wherein the voltage supply circuit includes a carry signal output terminal; the carry signal output terminal of the voltage supply circuit is electrically connected to the input terminal of an adjacent next stage of voltage supply circuit for providing an input signal to the input terminal of the adjacent next stage of voltage supply circuit.

In a fourth aspect, a display device includes the voltage supply module.

Optionally, the display device further includes a plurality of rows and a plurality of columns of pixel circuits, wherein the pixel circuit includes a light emitting element and a driving circuit, a data writing-in circuit, an initialization circuit and a second energy storage circuit; a first end of the driving circuit is electrically connected to the driving voltage output terminal, a second end of the driving circuit is electrically connected to the light emitting element, and the driving circuit is used to generate the current for driving the light emitting element to emit light under the control of a potential of the control terminal of the driving circuit; the voltage supply circuit included in the voltage supply module is electrically connected to the driving voltage output terminal, and is configured to provide a driving voltage to the driving voltage output terminal; the data writing-in circuit is electrically connected to a scanning line, a data line and the control end of the driving circuit, and is configured to control to write the data voltage on the data line into the control end of the driving circuit under the control of a scanning signal provided by the scanning line; the initialization circuit is electrically connected to an initialization control line, a reference voltage terminal, and the control end of the driving circuit, and is configured to write a reference voltage provided by the reference voltage terminal into the control end of the driving circuit under the control of an initialization control signal provided by the initialization control line; the second energy storage circuit is electrically connected to the control end of the driving circuit for storing electric energy.

Optionally, the pixel circuit further includes a driving control circuit; the driving control circuit is respectively electrically connected to the light emitting control line, the first end of the driving circuit and a fourth voltage terminal, and is configured to write a fourth voltage signal provided by the fourth voltage terminal into the first end of the driving circuit under the control of the light emitting control signal provided by the light emitting control line.

Optionally, an nth stage of voltage supply circuit in the voltage supply module includes at least two thirteenth transistors and at least two nth stage of driving voltage output terminals, and the at least two thirteenth transistors and the pixel circuit are both arranged in a display area; a devices included in the nth stage of voltage supply circuit other than the thirteenth transistor are all arranged in a peripheral area; n is a positive integer; the control electrode of the thirteenth transistor is electrically connected to a corresponding second node, the first electrode of the thirteenth transistor is electrically connected to a corresponding nth stage of driving voltage output terminal, and the second electrode of the thirteenth transistor is electrically connected to the initial voltage terminal; each nth stage of driving voltage output terminal is electrically connected to the first end of the driving circuit included in at least one pixel circuit located in an nth row, and is configured to provide a corresponding nth stage of driving voltage to the first end of the driving circuit included in the at least one pixel circuit located in the nth row.

Optionally, the driving circuit includes a driving transistor, the data writing-in circuit includes a data writing-in transistor, the initialization circuit includes an initialization transistor, the second energy storage circuit includes a storage capacitor; the driving control circuit includes a driving control transistor; a control electrode of the data writing-in transistor is electrically connected to the scanning line, a first electrode of the data writing-in transistor is electrically connected to the data line, and a second electrode of the data writing-in transistor is connected to a control electrode of the driving transistor; a control electrode of the initialization transistor is electrically connected to the initialization control line, a fast electrode of the initialization transistor is electrically connected to the reference voltage terminal, and a second electrode of the initialization transistor is electrically connected to the control electrode of the driving transistor; a first end of the storage capacitor is electrically connected to the control electrode of the driving transistor, the storage capacitor is electrically connected to a first electrode of the light-emitting element; a second electrode of the light-emitting element is electrically connected to the fourth voltage terminal; a first electrode of the driving transistor is electrically connected to the driving voltage output terminal, and a second electrode of the driving transistor is electrically connected to the first electrode of the light emitting element; a control electrode of the driving control transistor is electrically connected to the light emitting control line, a first electrode of the driving control transistor is electrically connected to the first electrode of the driving transistor, and a second electrode of the driving control transistor is connected to the fourth voltage terminal.

DETAILED DESCRIPTION

The following will clearly and completely describe the technical solutions in the embodiments of the present disclosure with reference to the accompanying drawings. Apparently, the described embodiments are only some of the embodiments of the present disclosure, not all of them. Based on the embodiments in the present disclosure, all other embodiments obtained by a person skilled in the art without creative work belong to the protection scope of the present disclosure.

The transistors used in all the embodiments of the present disclosure may be triodes, thin film transistors or field effect transistors or other devices with the same characteristics. In the embodiments of the present disclosure, in order to distinguish the two electrodes of the transistor other the control electrode, one electrode is called the first electrode, and the other electrode is called the second electrode.

In actual operation, when the transistor is a thin film transistor or a field effect transistor, the first electrode may be a drain electrode, and the second electrode may be a source electrode; or, the first electrode may be a source electrode, or the second electrode may be a drain electrode.

Figure 1:
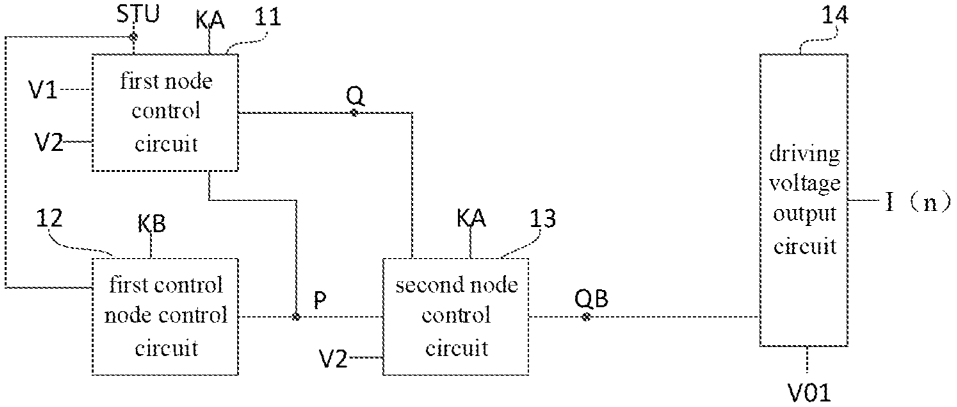
FIG. 1 is a structural diagram of a voltage supply circuit according to at least one embodiment of the present disclosure.

As shown in FIG. 1, the voltage supply circuit described in the embodiment of the present disclosure includes a first node control circuit 11, a first control node control circuit 12, a second node control circuit 13 and a driving voltage output circuit 14, wherein, The first node control circuit 11 is electrically connected to a first node Q, an input terminal STU, a first clock signal terminal KA, a first control node P, a first voltage terminal V1 and a second voltage terminal V2, and is configured to control a potential of the first node Q according to a first voltage signal provided by the first voltage terminal V1 and a second voltage signal provided by the second voltage terminal V2 under the control of an input signal provided by the input terminal STU, a first clock signal provided by the first clock signal terminal KA and a potential of the first control node P;

The first control node control circuit 12 is electrically connected to the first control node P, the input terminal STU and a second clock signal terminal KB respectively, is configured to control the potential of the first control node P under the control of the second clock signal provided by the second clock signal terminal KB and the input signal;

The second node control circuit 13 is electrically connected to a second node QB, the first control node P, the first clock signal terminal KA, the first node Q and the second voltage terminal V2 respectively, is configured to control a potential of the second node QB according to the first clock signal and the second voltage signal under the control of the potential of the first node Q, the potential of the first control node P and the first clock signal;

The driving voltage output circuit 14 is electrically connected to the second node QB, the driving voltage output terminal I(n) and the initial voltage terminal V01 respectively, and is configured to control the driving voltage output terminal I(n) to output a driving voltage according to the initial voltage provided by the initial voltage terminal V01 under the control of the potential of the second node.

The voltage supply circuit described in the embodiments of the present disclosure can provide a driving voltage for a pixel circuit capable of realizing an internal compensation function, and the pixel circuit has a simple structure and can realize extremely high PPI.

In at least one embodiment of the present disclosure, the first voltage terminal V1 may be a first high voltage terminal for providing a first high voltage signal, and the second voltage terminal V2 may be a first low voltage terminal for providing a first low voltage signal; but not limited thereto.

When the voltage supply circuit described in the embodiments of the present disclosure is in operation, the voltage supply period may include the first phase, the second phase, the third phase, the fourth phase and the fifth phase which are set successively;

In the first phase, the first node control circuit 11 controls the potential of the first node Q to be the first level, the first control node control circuit 12 controls the potential of the first control node P, and the second node control circuit 13 controls the potential of the second node QB to be the second level;

In the second phase, the first node control circuit 11 controls the potential of the first node Q to be the first level, the first control node control circuit 12 controls the potential of the first control node P to be the first level, and the second node control circuit 13 controls the potential of the second node QB to be the second level;

In the third phase, the first node control circuit 11 controls the potential of the first node Q to be the second level, the first control node control circuit 12 controls the potential of the first control node P to be the first level, and the second node control circuit 13 controls the potential of the second node QB to be the first level, and the driving voltage output circuit 14 controls the driving voltage output terminal I(n) to output the initial voltage under the control of the potential of the second node QB;

In the fourth phase, the first node control circuit 11 controls the potential of the first node Q to the second level, the first control node control circuit 12 controls the potential of the first control node P, and the second node control circuit 13 controls the potential of the second node QB to be the first level, and the driving voltage output circuit 14 controls the driving voltage output terminal I(n) to output the initial voltage under the control of the potential of the second node QB;

In the fifth phase, the first node control circuit 11 controls the potential of the first node Q to the first level, the first control node control circuit 12 controls the potential of the first control node P and the second node control circuit 13 controls the potential of the second node QB to be the second level.

Figure 2:
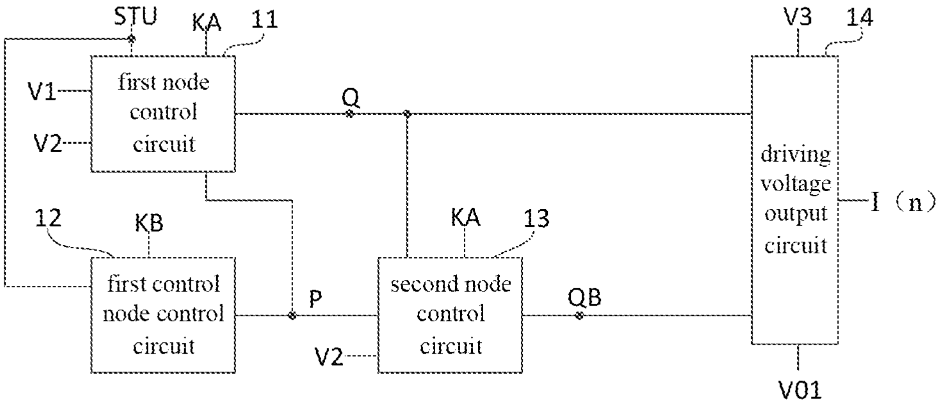
FIG. 2 is a structural diagram of a voltage supply circuit according to at least one embodiment of the present disclosure.

In at least one embodiment of the present disclosure, as shown in FIG. 2, on the basis of the embodiment of the voltage supply circuit shown in FIG. 1, the driving voltage output circuit 14 is further electrically connected to the first node Q and the third voltage terminal V3, is configured to control the driving voltage output terminal I(n) to be electrically connected to the third voltage terminal V3 under the control of the potential of the first node Q.

Optionally, the third voltage terminal V3 may be the second high voltage terminal, but not limited thereto.

When at least one embodiment of the voltage supply circuit shown in FIG. 2 of the present disclosure is in operation, In the first phase, the second phase and the fifth phase, the driving voltage output circuit 14 controls the driving voltage output terminal I(n) to be connected to the third voltage terminal V3 under the control of the potential of the first node Q.

Figure 3:
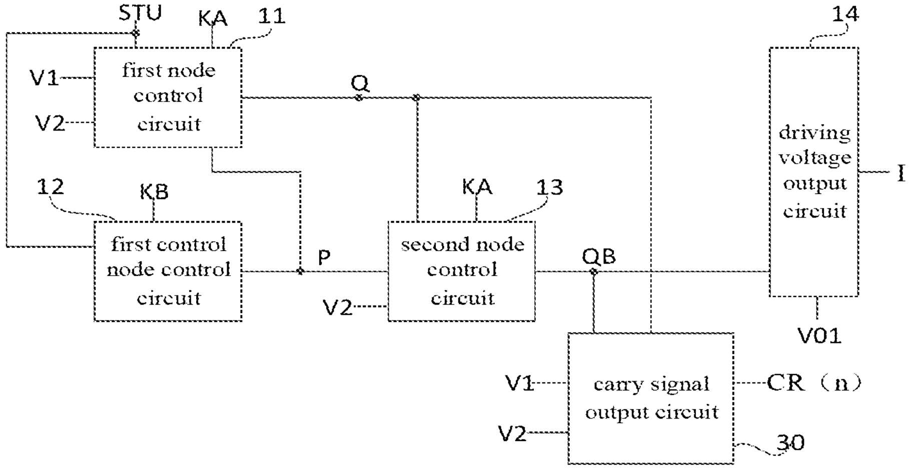
FIG. 3 is a structural diagram of a voltage supply circuit according to at least one embodiment of the present disclosure.

As shown in FIG. 3, on the basis of the voltage supply circuit shown in FIG. 1, the voltage supply circuit described in at least one embodiment of the present disclosure may further include a carry signal output circuit 30;

The carry signal output circuit 30 is respectively electrically connected to the carry signal output terminal CR(n), the first node Q, the second node QB, the first voltage terminal V1 and the second voltage terminal V2, is configured to control the carry signal output terminal CR(n) to output a carry signal according to the first voltage signal provided by the first voltage terminal V1 and the second voltage signal provided by the second voltage terminal V2 under the control of the potential of the first node Q and the potential of the second node QB.

When the voltage supply circuit described in at least one embodiment of the present disclosure is in operation, the carry signal outputted by one row of voltage supply circuit can provide an input signal for the input terminal of an adjacent next row of voltage supply circuit, but not limited thereto.

When the voltage supply circuit shown in FIG. 3 of at least one embodiment of the present disclosure is in operation, In the first phase, the second phase and the fifth phase, the carry signal output circuit 30 controls the carry signal output terminal CR(n) to be connected to the first voltage terminal V1 under the control of the potential of the first node Q;

In the third phase and the fourth phase, the carry signal output circuit 30 controls to connect the carry signal output terminal CR(n) and the second voltage terminal V2 under the control of the potential of the second node QB.

In at least one embodiment of the present disclosure, the first node control circuit may include a second control node control sub-circuit, a first node control sub-circuit and a first energy storage circuit;

The second control node control sub-circuit is electrically connected to the second control node, the input terminal and the first clock signal output terminal, and is configured to control to connect the second control node and the input terminal under the control of the first clock signal;

A first end of the first energy storage circuit is electrically connected to the second control node, a second end of the first energy storage circuit is electrically connected to the first node, and the first energy storage circuit is used for store electrical energy;

The first node control sub-circuit is electrically connected to the second control node, the first node, the first voltage terminal, the first clock signal terminal, the first control node and the second voltage terminal, respectively, is configured to control to connect the first node and the first voltage terminal under the control of the potential of the second control node, control to connect the first node and the second voltage terminal under the control of the first clock signal and the potential of the first control node.

In specific implementation, the first node control circuit may include a second control node control sub-circuit, a first node control sub-circuit and a first energy storage circuit; the second control node control sub-circuit is configured to control the potential of the second control node, the first energy storage circuit is configured to control the potential of the first node according to the potential of the second control node, and the first node control sub-circuit is configured to control the potential of the first node.

Figure 4:
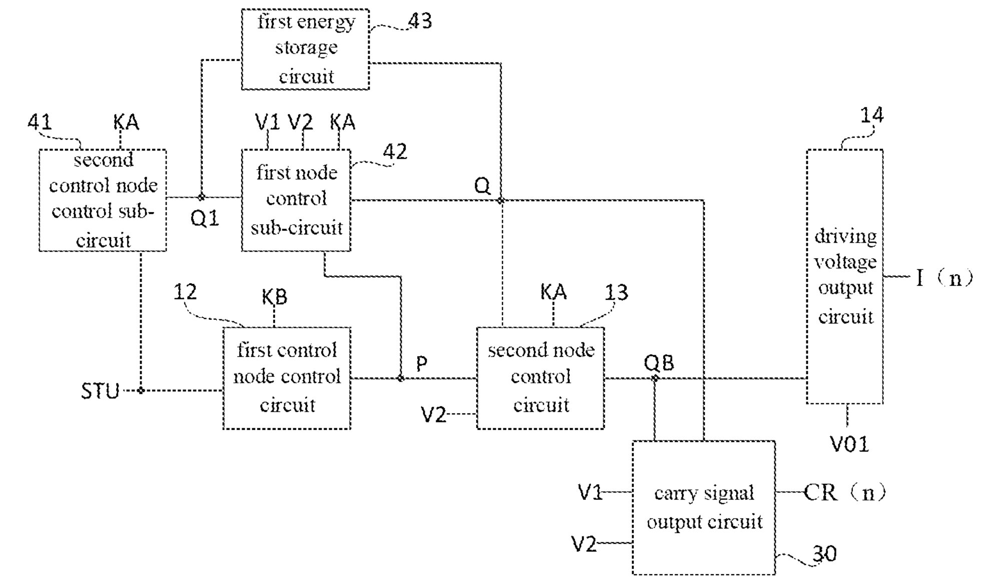
FIG. 4 is a structural diagram of a voltage supply circuit according to at least one embodiment of the present disclosure.

As shown in FIG. 4, on the basis of the voltage supply circuit shown in FIG. 3, the first node control circuit may include a second control node control sub-circuit 41, a first node control sub-circuit 42 and a first energy storage circuit 43;

The second control node control sub-circuit 41 is electrically connected to the second control node Q1, the input terminal STU and the first clock signal output terminal KA, and is configured to connect the second control node Q1 and the input terminal STU under the control of the first clock signal;

The first end of the first energy storage circuit 43 is electrically connected to the second control node Q1, the second end of the first energy storage circuit 43 is electrically connected to the first node Q. and the first energy storage circuit 43 is configured to store electric energy;

The first node control sub-circuit 42 is electrically connected to the second control node Q1, the first node Q, the first voltage terminal V1, the first clock signal terminal KA, the first control node P and the second voltage terminal V2, and is configured to control to connect the first node Q and the first voltage terminal V1 under the control of the potential of the second control node Q1, and control to connect the first node Q and the second voltage terminal V2 under the control of the first clock signal and the potential of the first control node P.

Optionally, the first node control circuit includes a first transistor, a second transistor, a third transistor, and a fourth transistor;

A control electrode of the first transistor is electrically connected to the input terminal, a first electrode of the first transistor is electrically connected to the first voltage terminal, and a second electrode of the first transistor is electrically connected to a first electrode of the second transistor;

A control electrode of the second transistor is electrically connected to the first clock signal terminal, and a second electrode of the second transistor is electrically connected to the first node;

A control electrode of the third transistor is electrically connected to the first clock signal terminal, a first electrode of the third transistor is electrically connected to the first node, and a second electrode of the third transistor is electrically connected to a first electrode of the fourth transistor;

A control electrode of the fourth transistor is electrically connected to the first control node, and a second electrode of the fourth transistor is electrically connected to the second voltage terminal.

Figure 5:
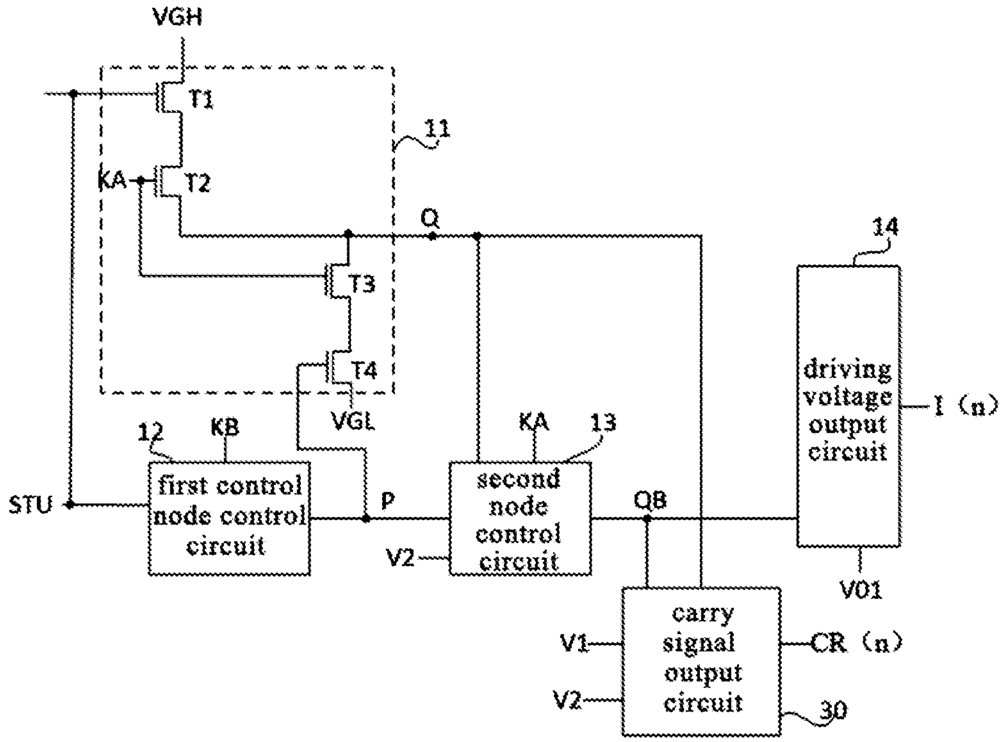
FIG. 5 is a structural diagram of a voltage supply circuit according to at least one embodiment of the present disclosure.

As shown in FIG. 5, on the basis of at least one embodiment of the voltage supply circuit shown in FIG. 3, the first node control circuit 11 may include a first transistor T1, a second transistor T2, a third transistor T3 and a fourth transistor T4;

The gate electrode of the first transistor T1 is electrically connected to the input terminal STU, the drain electrode of the first transistor T1 is electrically connected to the first high voltage terminal VGH, and the source electrode of the first transistor T1 is electrically connected to the drain electrode of the second transistor T2; the first high voltage terminal VGH is used to provide a first high voltage Vgh;

The gate electrode of the second transistor T2 is electrically connected to the first clock signal terminal KA, and the source electrode of the second transistor T2 is electrically connected to the first node Q;

The gate electrode of the third transistor T3 is electrically connected to the first clock signal terminal KA, the drain electrode of the third transistor T3 is electrically connected to the first node Q, and the source electrode of the third transistor T3 is electrically connected to the drain electrode of the fourth transistor T4;

The gate electrode of the fourth transistor T4 is electrically connected to the first control node P, and the source electrode of the fourth transistor T4 is electrically connected to the first low voltage terminal VGL.

In the voltage supply circuit shown in FIG. 5, T1, T2, T3 and T4 may all be N-type metal-oxide-semiconductor (NMOS) transistors, but not limited thereto.

In the voltage supply circuit shown in FIG. 5, the width-to-length ratio of T2 is greater than that of T1, so that the current passing through T1 can be amplified by T2, thereby shortening the time for the potential of the first node Q to reach Vgh. For example, when the width-to-length ratio of T1 is 10:10, the width-to-length ratio of T2 may be 20:10 or 40:10, but not limited thereto.

Optionally, the first node control circuit further includes a fifth transistor;

The second electrode of the second transistor and the first electrode of the third transistor are electrically connected to the first node through the fifth transistor;

A control electrode of the fifth transistor is electrically connected to the first voltage terminal, and a first electrode of the fifth transistor is electrically connected to the second electrode of the second transistor and the first electrode of the third transistor respectively, a second electrode of the fifth transistor is electrically connected to the first node.

Figure 6:
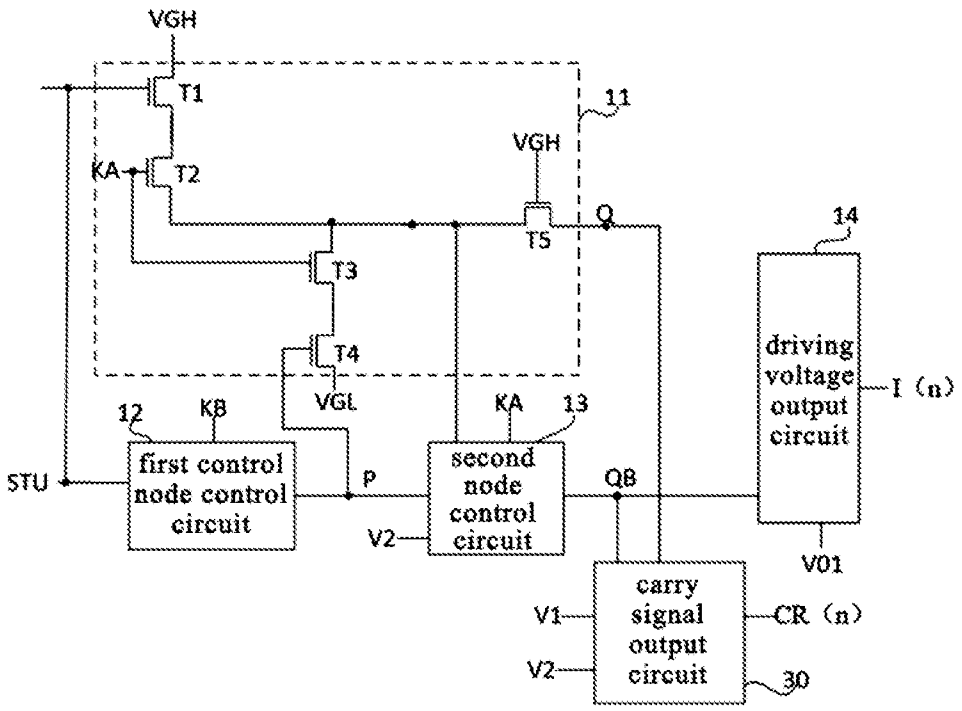
FIG. 6 is a structural diagram of a voltage supply circuit according to at least one embodiment of the present disclosure.

As shown in FIG. 6, on the basis of the voltage supply circuit shown in FIG. 5, the first node control circuit 11 further includes a fifth transistor T5;

The source electrode of the second transistor T2 and the drain electrode of the third transistor T3 are electrically connected to the first node Q through the fifth transistor T5;

The gate electrode of the fifth transistor T5 is electrically connected to the first high voltage terminal VGH, and the drain electrode of the fifth transistor T5 is respectively connected to the source electrode of the second transistor T2 and the drain electrode of the third transistor T3, and the source electrode of the fifth transistor T5 is electrically connected to the first node Q;

The second node control circuit 13 is electrically connected to the first node Q through the fifth transistor T5.

In at least one embodiment of the present disclosure, the first node control circuit 11 may further include a fifth transistor T5, the gate electrode of the fifth transistor T5 is electrically connected to the first high voltage terminal VGH, and when the first transistor T1 and the second transistor T2 included in the first node control circuit are turned off the fifth transistor T5 can be completely turned off (when the gate-source voltage of the fifth transistor T5 is 0, the fifth transistor T5 is completely turned off), to prevent leakage current from affecting the potential of the first node Q.

Optionally, the second control node control sub-circuit includes a first transistor;

A control electrode of the first transistor is electrically connected to the first clock signal terminal, a first electrode of the first transistor is electrically connected to the input terminal, and a second electrode of the first transistor is electrically connected to the second control node;

The first energy storage circuit includes a first capacitor;

A first end of the first capacitor is electrically connected to the second control node, and a second end of the first capacitor is electrically connected to the first node;

The first node control sub-circuit includes a second transistor, a third transistor and a fourth transistor.

A control electrode of the second transistor is electrically connected to the second control node, a first electrode of the second transistor is electrically connected to the first voltage terminal, and a second electrode of the second transistor is electrically connected to the first node;

A control electrode of the third transistor is electrically connected to the first clock signal terminal, a first electrode of the third transistor is electrically connected to the first node, and a second electrode of the third transistor is electrically connected to a first electrode of the fourth transistor;

A control electrode of the fourth transistor is electrically connected to the first control node, and a second electrode of the fourth transistor is electrically connected to the second voltage terminal.

The first node control sub-circuit further includes a fifth transistor;

The second electrode of the second transistor and the first electrode of the third transistor are electrically connected to the first node through the fifth transistor;

A control electrode of the fifth transistor is electrically connected to the first voltage terminal, a first electrode of the fifth transistor is electrically connected to the second electrode of the second transistor and the first electrode of the third transistor respectively, a second electrode of the fifth transistor is electrically connected to the first node.

Optionally, the first node control sub-circuit further includes a fifth transistor;

The second electrode of the second transistor and the first electrode of the third transistor are electrically connected to the first node through the fifth transistor;

A control electrode of the fifth transistor is electrically connected to the first voltage terminal, a first electrode of the fifth transistor is electrically connected to the second electrode of the second transistor and the first electrode of the third transistor respectively, a second electrode of the fifth transistor is electrically connected to the first node.

Optionally, the first control node control circuit includes a sixth transistor and a seventh transistor;

A control electrode of the sixth transistor is electrically connected to the second clock signal terminal, a first electrode of the sixth transistor is electrically connected to the first voltage terminal or the second clock signal terminal, and a second electrode of the sixth transistor is electrically connected to the first control node;

A control electrode of the seventh transistor is electrically connected to the input terminal, a first electrode of the seventh transistor is electrically connected to the first control node, and a second electrode of the seventh transistor is electrically connected to the second clock signal terminal.

Figure 7:
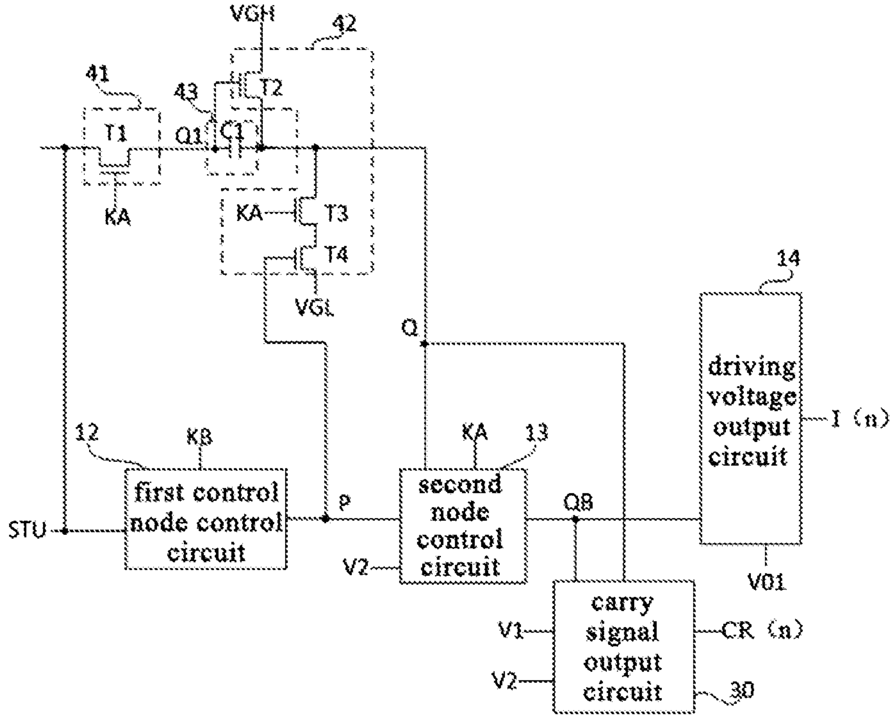
FIG. 7 is a structural diagram of a voltage supply circuit according to at least one embodiment of the present disclosure.

As shown in FIG. 7, on the basis of the voltage supply circuit shown in FIG. 4, the second control node control sub-circuit 41 includes a first transistor T1;

The gate electrode of the first transistor T1 is electrically connected to the first clock signal terminal KA, the drain electrode of the first transistor T1 is electrically connected to the input terminal STU, and the source electrode of the first transistor T1 is electrically connected to the second control node Q1;

The first energy storage circuit 43 includes a first capacitor C1;

A first end of the first capacitor C1 is electrically connected to the second control node Q1, and a second end of the first capacitor C1 is electrically connected to the first node Q;

The first node control sub-circuit 42 includes a second transistor T2, a third transistor T3 and a fourth transistor T4;

The gate electrode of the second transistor T2 is electrically connected to the second control node Q1, the drain electrode of the second transistor T2 is electrically connected to the first high voltage terminal VGH, and the source electrode of the second transistor T2 is electrically connected to the first node Q;

The gate electrode of the third transistor T3 is electrically connected to the first clock signal terminal KA, the drain electrode of the third transistor T3 is electrically connected to the first node Q, and the source electrode of the third transistor T3 is electrically connected to the drain electrode of the fourth transistor T4;

The gate electrode of the fourth transistor T4 is electrically connected to the first control node P and the source electrode of the fourth transistor T4 is electrically connected to the first low voltage terminal VGL.

In the voltage supply circuit shown in FIG. 7, T1, T2, T3 and T4 may all be NMOS transistors, but not limited thereto.

In the voltage supply circuit shown in FIG. 7, the width-to-length ratio of T2 is greater than that of T1, so that the current passing through T1 can be amplified by T2, thereby shortening the time for the potential of the fast node Q to reach Vgh. For example, when the width-to-length ratio of T1 is 10:10, the width-to-length ratio of T2 may be 20:10 or 40:10, but not limited thereto.

Optionally, the second node control circuit includes an eighth transistor, a ninth transistor, a second capacitor, and a tenth transistor;

A control electrode of the eighth transistor is electrically connected to the first control node, a first electrode of the eighth transistor is electrically connected to the first clock signal terminal, and a second electrode of the eighth transistor is electrically connected to a first electrode of the ninth transistor;

A first end of the second capacitor is electrically connected to the first control node, and a second end of the second capacitor is electrically connected to the first electrode of the ninth transistor;

A control electrode of the ninth transistor is electrically connected to the first clock signal terminal, and a second electrode of the ninth transistor is electrically connected to the second node;

A control electrode of the tenth transistor is electrically connected to the first node, a first electrode of the tenth transistor is electrically connected to the second node, and a second electrode of the tenth transistor is electrically connected to the second voltage terminal.

In at least one embodiment of the present disclosure, the second node control circuit further includes a third capacitor;

A first end of the third capacitor is electrically connected to the second node, and a second end of the third capacitor is electrically connected to the second voltage terminal.

Optionally, the carry signal output circuit includes an eleventh transistor and a twelfth transistor;

A control electrode of the eleventh transistor is electrically connected to the first node, a first electrode of the eleventh transistor is electrically connected to the first voltage terminal, and a second electrode of the eleventh transistor is electrically connected to the carry signal output terminal;

A control electrode of the twelfth transistor is electrically connected to the second node, a first electrode of the twelfth transistor is electrically connected to the carry signal output terminal, and a second electrode of the twelfth transistor is electrically connected to the second voltage terminal.

Optionally, the driving voltage output circuit includes a thirteenth transistor;

A control electrode of the thirteenth transistor is electrically connected to the second node, a first electrode of the thirteenth transistor is electrically connected to the driving voltage output terminal, and s second electrode of the thirteenth transistor is electrically connected to the initial voltage terminal.

Figure 8:
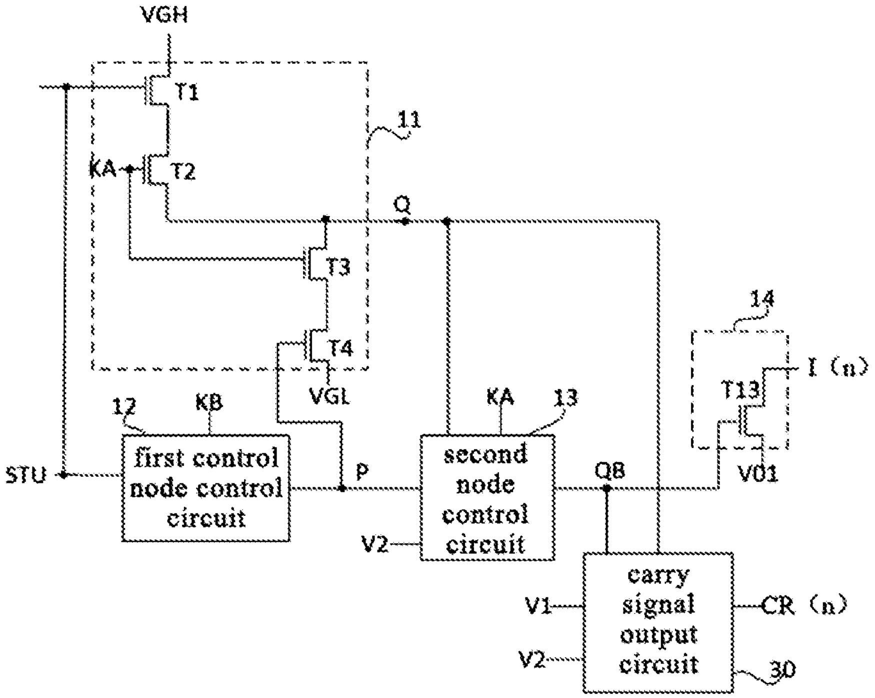
FIG. 8 is a structural diagram of a voltage supply circuit according to at least one embodiment of the present disclosure.

As shown in FIG. 8, on the basis of the voltage supply circuit shown in FIG. 5, the driving voltage output circuit 14 may include a thirteenth transistor T13;

A gate electrode of the thirteenth transistor T13 is electrically connected to the second node QB, a drain electrode of the thirteenth transistor T13 is electrically connected to the driving voltage output terminal I(n), and a source electrode of the thirteenth transistor T13 is electrically connected to the initial voltage terminal V01.

Optionally, the driving voltage output circuit includes a thirteenth transistor, a fourteenth transistor and a fourth capacitor;

A control electrode of the fourteenth transistor is electrically connected to the first node, a first electrode of the fourteenth transistor is electrically connected to the third voltage terminal, and a second electrode of the fourteenth transistor is electrically connected to the driving voltage output terminal;

A control electrode of the thirteenth transistor is electrically connected to the second node, a first electrode of the thirteenth transistor is electrically connected to the driving voltage output terminal, and a second electrode of the thirteenth transistor is electrically connected to the initial voltage terminal;

A first end of the fourth capacitor is electrically connected to the first node, and a second end of the fourth capacitor is electrically connected to the driving voltage output terminal.

Figure 9:
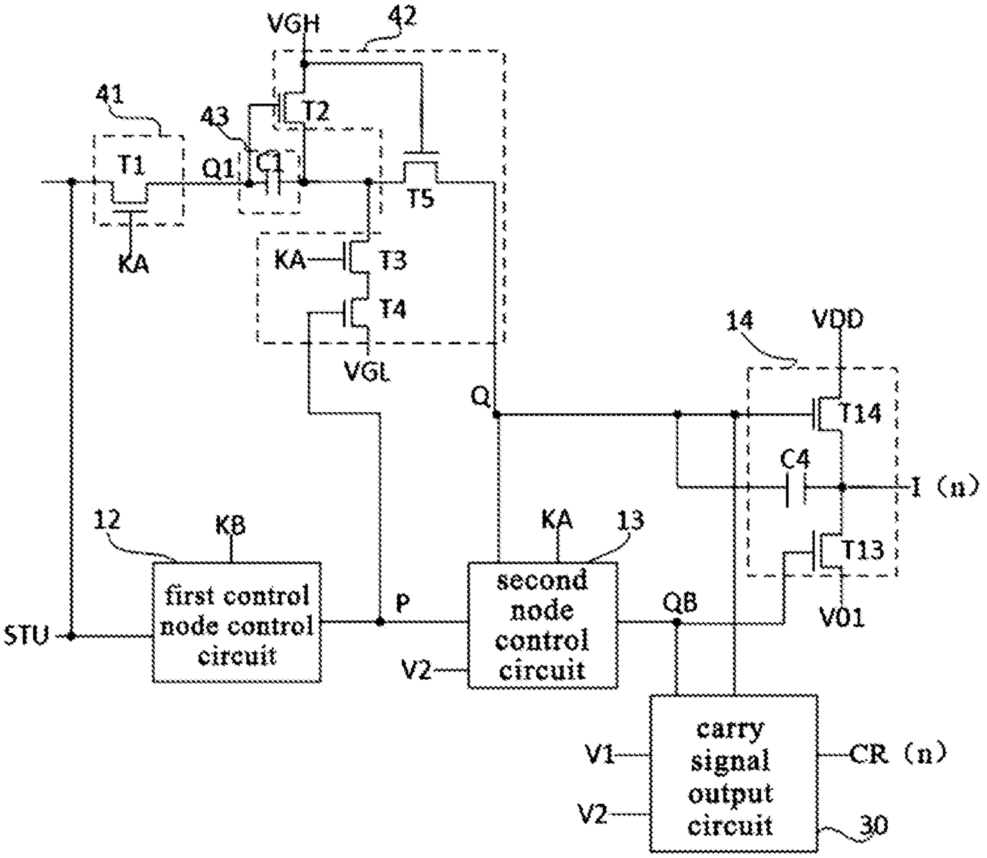
FIG. 9 is a structural diagram of a voltage supply circuit according to at least one embodiment of the present disclosure.

As shown in FIG. 9, on the basis of the voltage supply circuit shown in FIG. 7, the second control node control sub-circuit 41 further includes a fifth transistor T5;

The source electrode of the second transistor T2 and the drain electrode of the third transistor T3 are electrically connected to the first node Q through the fifth transistor T5;

The gate electrode of the fifth transistor T5 is electrically connected to the first high voltage terminal VGH, and the drain electrode of the fifth transistor T5 is respectively connected to the source electrode of the second transistor T2 and the drain electrode of the third transistor T3, and the source electrode of the fifth transistor T5 is electrically connected to the first node Q;

The driving voltage output circuit 14 is also electrically connected to the first node Q and the second high voltage terminal VDD, and is configured to control to connect the driving voltage output terminal I (n) and the second high voltage terminal VDD under the control of the potential of the first node Q;

The driving voltage output circuit 14 may include a thirteenth transistor T13, a fourteenth transistor T14 and a fourth capacitor C4;

The gate electrode of the fourteenth transistor T14 is electrically connected to the first node Q, the drain electrode of the fourteenth transistor T4 is electrically connected to the second high voltage terminal VDD, and the source electrode of the fourteenth transistor T14 is electrically connected to the driving voltage output terminal I(n);

The gate electrode of the thirteenth transistor T13 is electrically connected to the second node Q1, the drain electrode of the thirteenth transistor T13 is electrically connected to the driving voltage output terminal I(n), and the source electrode of the thirteenth transistor T13 is electrically connected to the initial voltage terminal V01;

A first end of the fourth capacitor C4 is electrically connected to the first node Q, and a second end of the fourth capacitor C4 is electrically connected to the driving voltage output terminal I(n).

In the voltage supply circuit shown in FIG. 9, the fourth capacitor C4 is connected between the first node Q and the driving voltage output terminal I(n), to improve the driving ability of I(n).

In the voltage supply circuit shown in FIG. 9, the width-to-length ratio of T2 is greater than that of T1, so that the current passing through T1 can be amplified by T2, thereby shortening the time for the potential of the first node Q to reach Vgh; the width-to-length ratio of T14 is greater than that of T2 to enable high-current driving.

In the voltage supply circuit shown in FIG. 9, the first node control circuit 11 further includes a fifth transistor T5, the gate electrode of T5 is electrically connected to the first high voltage terminal VGH, to prevent false output caused by current leakage of T2.

In the voltage supply circuit shown in FIG. 9, if the fifth transistor T5 is not provided, due to the coupling effect of C4, when the driving voltage outputted by I(n) is a high voltage, the potential of the first node Q is also pulled high, and due to the coupling effect of C1, the potential of the second node Q1 is also pulled high, that is, the potential of the gate electrode of T2 and the potential of the source electrode of T2 are both high voltages, and T2 has a risk of current leakage. Based on this, in at least one embodiment of the present disclosure, a fifth transistor T5 is provided between the first node Q and the second node Q, so as to prevent false output caused by current leakage of T2.

Figure 10:
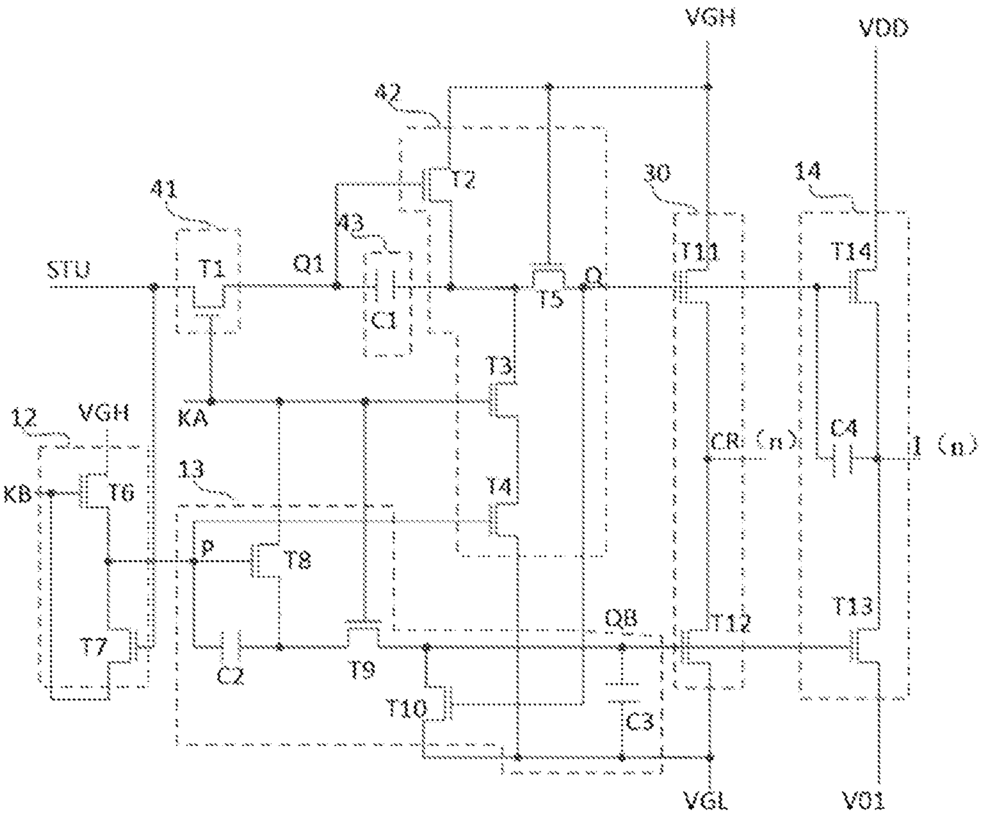
FIG. 10 is a circuit diagram of a voltage supply circuit according to at least one embodiment of the present disclosure.

As shown in FIG. 10, on the basis of the voltage supply circuit shown in FIG. 9, the first control node control circuit 12 includes a sixth transistor T6 and a seventh transistor T7;

The gate electrode of the sixth transistor T6 is electrically connected to the second clock signal terminal KB, the drain electrode of the sixth transistor T6 is electrically connected to the first high voltage terminal VGH, and the source electrode of the sixth transistor T6 is electrically connected to the first control node P;

The gate electrode of the seventh transistor T7 is electrically connected to the input terminal STU, the drain electrode of the seventh transistor T7 is electrically connected to the first control node P. and the source electrode of the seventh transistor T7 is electrically connected to the second clock signal terminal KB;

The second node control circuit 13 includes an eighth transistor T8, a ninth transistor T9, a second capacitor C2 and a tenth transistor T10;

The gate electrode of the eighth transistor T8 is electrically connected to the first control node P, the drain electrode of the eighth transistor T8 is electrically connected to the first clock signal terminal KA, and the source electrode of the eighth transistor T8 electrically connected to the drain electrode of the ninth transistor T9;

A first end of the second capacitor C2 is electrically connected to the first control node P, and a second end of the second capacitor C2 is electrically connected to the drain electrode of the ninth transistor T9;

The gate electrode of the ninth transistor T9 is electrically connected to the first clock signal terminal KA, and the source electrode of the ninth transistor T9 is electrically connected to the second node QB;

The gate electrode of the tenth transistor T10 is electrically connected to the first node Q, the drain electrode of the tenth transistor T10 is electrically connected to the second node QB, and the source electrode of the tenth transistor T10 is electrically connected to the first low voltage terminal VGL;

The second node control circuit 13 further includes a third capacitor C3;

A first end of the third capacitor C3 is electrically connected to the second node QB, and a second end of the third capacitor is electrically connected to the first low voltage end VGL;

The carry signal output circuit 30 includes an eleventh transistor T11 and a twelfth transistor T12;

The gate electrode of the eleventh transistor T11 is electrically connected to the first node Q, the drain electrode of the eleventh transistor T11 is electrically connected to the first high voltage terminal VGH, and the source electrode of the eleventh transistor T11 is electrically connected to the carry signal output terminal CR(n);

The gate electrode of the twelfth transistor T12 is electrically connected to the second node QB, the drain electrode of the twelfth transistor T12 is electrically connected to the carry signal output terminal CR(n), and the source electrode of the twelfth transistor T12 is electrically connected to the first low voltage terminal VGL In the voltage supply circuit shown in FIG. 10, all transistors are NMOS transistors, but not limited thereto.

At least one embodiment of the voltage supply circuit described in the present disclosure can provide high voltage and low voltage in a time division manner through I(n), reduce the number of transistors, and thus realize narrow borders.

In the voltage supply circuit shown in FIG. 10, when the potential of the second control node Q1 is a high voltage, T4 is turned on, the potential of the first end of C1 rises from a low voltage to a high voltage, and the potential of the second end of C1 also rises correspondingly, thereby ensuring that the potential of the first node Q is a high voltage, which can fully turn on T14 and improve the driving capability of I(n).

In the voltage supply circuit shown in FIG. 10, the second control node Q1 is a first stage of pull-up node, and the first node Q is a second stage of pull-up node;

Since the n-type transistor will lose the threshold voltage when it transmits a high voltage, if only one stage of pull-up node is used, the potential of the pull-up node will be low, so that the corresponding driving voltage output transistor cannot be fully turned on, which in turn makes the driving ability of I(n) weak; based on this, the voltage supply circuit shown in FIG. 10 adopts two stages of pull-up nodes to improve the driving ability of I(n).

In at least one embodiment of the present disclosure, the voltage value of the first high voltage signal provided by the first high voltage terminal VGH may be greater than or equal to 15V and less than or equal to 20V, and the voltage value of the second high voltage signal provided by the second high voltage terminal VDD may be greater than or equal to 12V and less than or equal to 16V, but not limited thereto.

Figure 11:
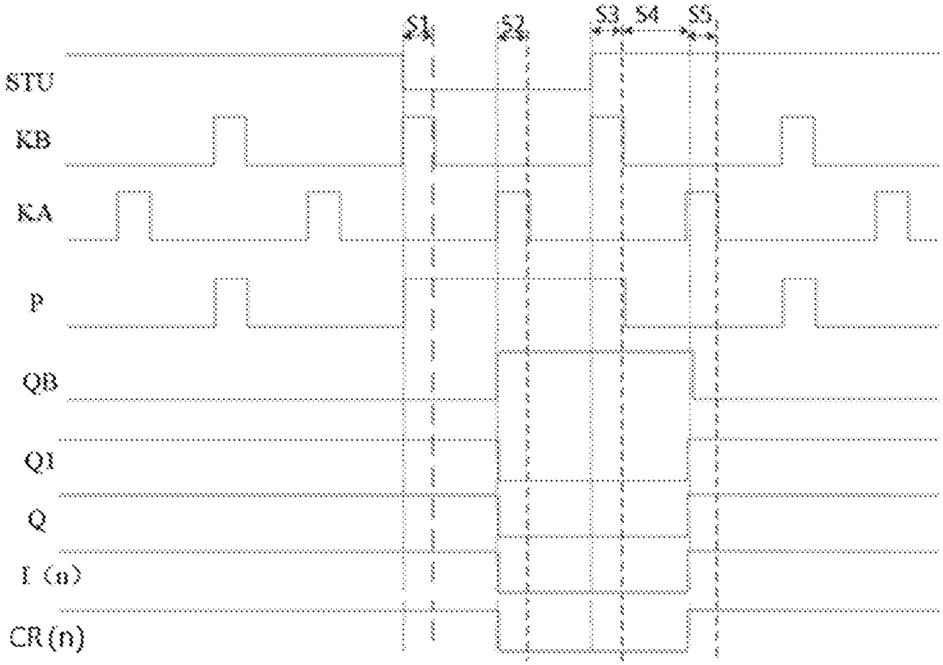
FIG. 11 is a timing diagram of the voltage supply circuit shown in FIG. 10.

As shown in FIG. 11, when the voltage supply circuit shown in FIG. 10 is in operation, the voltage supply period includes a first phase S1, a second phase S2, a third phase S3, a fourth phase S4 and a fifth phase S5 that are set successively;

In the first phase S1, STU inputs a low voltage signal, KB provides a high voltage signal, KA provides a low voltage signal, T6 is turned on, the potential of the first control node P is a high voltage, T7 is turned off, T8 is turned on, T9 is turned off, and the potential of the second control node Q1 is maintained at a high voltage. T2 is turned on, the potential of the first node Q is at a high voltage, T11 and T14 are turned on, CR(n) outputs a high voltage signal, and I(n) outputs a high voltage signal;

In the second phase S2, STU inputs a low voltage signal, KB provides a low voltage signal, KA provides a high voltage signal, T6 and T7 are turned off, the potential of the first control node P is maintained at a high voltage. T1 is turned on, and the potential of the second control node Q1 is a low voltage, T2 is turned off T3 and T4 are turned on, the potential of the first node Q is a low voltage, T11 and T14 are turned off, T10 is turned off, T9 is turned on to pull up the potential of the second node QB. T12 and T13 are turned on, CR(n) outputs a low voltage signal, I(n) is connected to the initial voltage terminal V01, the initial voltage terminal V01 provides a low voltage signal, and I(n) outputs a low voltage signal;

In the third phase S3, STU outputs a high voltage signal, KB provides a high voltage signal, KA provides a low voltage signal, T6 and T7 are turned on, the potential of the first control node P is a high voltage, T8 is turned on, T3 and T4 are turned on to control the potential of the first node Q to be maintained at a low voltage. T9 is turned on, the potential of the second node QB is at a high voltage, T12 and T13 are turned on, CR(n) outputs a low voltage signal, and I(n) is connected to the initial voltage terminal V01, the initial voltage terminal V01 provides a low voltage signal, and I(n) outputs a low voltage signal;

In the fourth phase S4, STU outputs a high voltage signal, KB provides a low voltage signal, KA provides a low voltage signal, T7 is turned on, the first control node P is connected to KB, and the potential of the first control node P is a low voltage signal. T3 and T4 are turned off, T1 is turned off, the potential of the second control node Q1 is maintained at a low voltage, T2 is turned off, the potential of the first node Q is maintained at a low voltage, T9 is turned off, and the potential of the second node QB is maintained at a high voltage, T12 and T13 are turned on, CR(n) outputs a low voltage signal, I(n) is connected to the initial voltage terminal VOL the initial voltage terminal V01 provides a low voltage signal, and I(n) outputs a low voltage signal;

In the fifth phase S5, STU outputs a high voltage signal, KB provides a low voltage signal, KA provides a high voltage signal, T1 is turned on, the potential of the second control node Q1 is a high voltage, T2 is turned on, and the potential of the first node Q is a high voltage, T11 and T14 are turned on, CR(n) outputs a high voltage signal, I(n) outputs a high voltage signal; T10 is turned on, the potential of the second node QB is a low voltage, T12 and T13 are turned off; T7 is turned on, the first control node P is connected to KB, and the potential of the first control node P is a low voltage.

Figure 12:
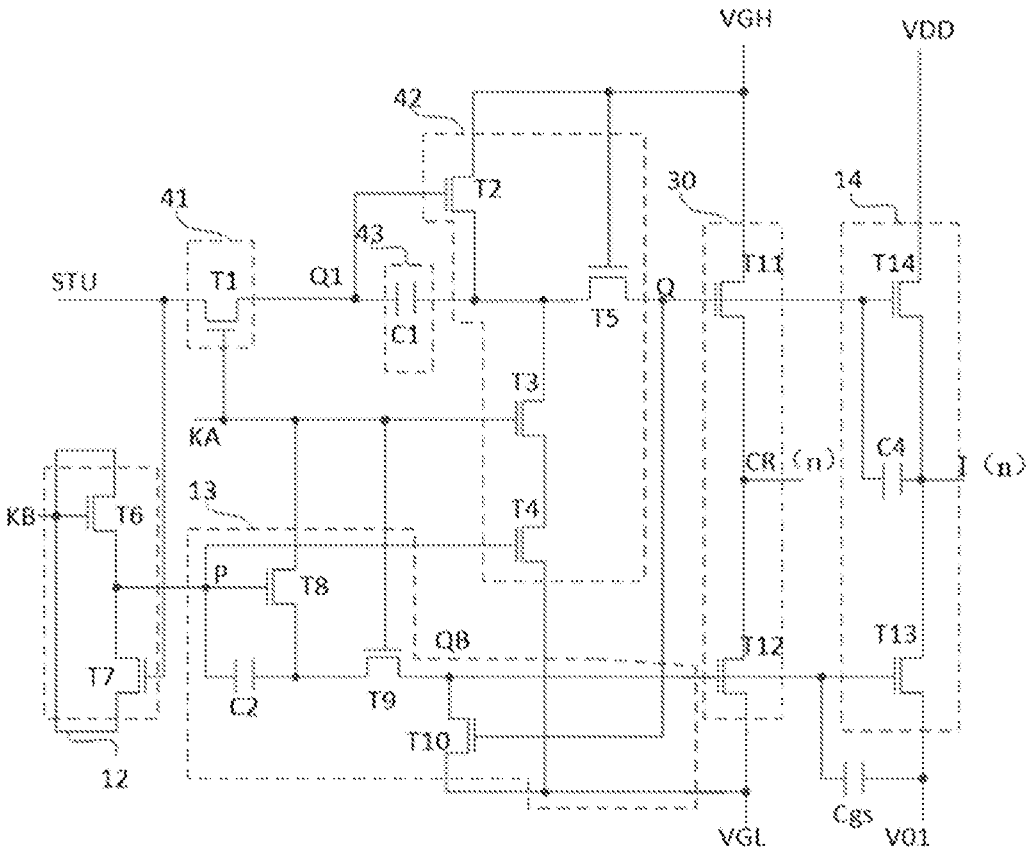
FIG. 12 is a circuit diagram of a voltage supply circuit according to at least one embodiment of the present disclosure.

The difference between the voltage supply circuit shown in FIG. 12 of the present disclosure and the voltage supply circuit shown in FIG. 10 of the present disclosure is that:

The drain electrode of T6 is electrically connected to the second clock signal terminal KB, and since the gate-source parasitic capacitance Cgs of T13 is relatively large, the third capacitor C3 may not be provided.

Figure 13:
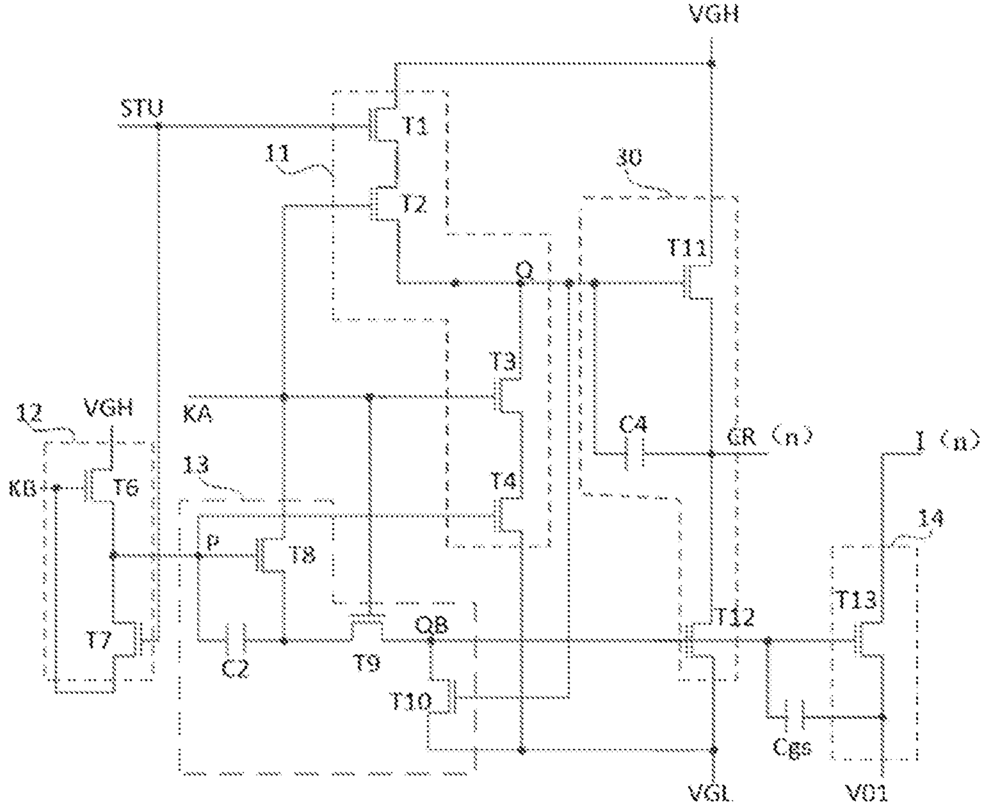
FIG. 13 is a circuit diagram of a voltage supply circuit according to at least one embodiment of the present disclosure.

As shown in FIG. 13, on the basis of the voltage supply circuit shown in FIG. 8, The first control node control circuit 42 includes a sixth transistor T6 and a seventh transistor T7;

The gate electrode of the sixth transistor T6 is electrically connected to the second clock signal terminal KB, the drain electrode of the sixth transistor T6 is electrically connected to the first high voltage terminal VGH, and the source electrode of the sixth transistor T6 is electrically connected to the first control node P;

The gate electrode of the seventh transistor T7 is electrically connected to the input terminal STU, the drain electrode of the seventh transistor T7 is electrically connected to the first control node P, and the source electrode of the seventh transistor T7 is electrically connected to the second clock signal terminal KB;

The second node control circuit 13 includes an eighth transistor T8, a ninth transistor T9, a second capacitor C2 and a tenth transistor T10;

The gate electrode of the eighth transistor T8 is electrically connected to the first control node P, the drain electrode of the eighth transistor T8 is electrically connected to the first clock signal terminal KA, and the source electrode of the eighth transistor T8 is electrically connected to the drain electrode of the ninth transistor T9;

A first end of the second capacitor C2 is electrically connected to the first control node P, and a second end of the second capacitor C2 is electrically connected to the drain electrode of the ninth transistor T9;

The gate electrode of the ninth transistor T9 is electrically connected to the first clock signal terminal KA, and the source electrode of the ninth transistor T9 is electrically connected to the second node QB;

The gate electrode of the tenth transistor T10 is electrically connected to the first node Q, the drain electrode of the tenth transistor T10 is electrically connected to the second node QB, and the source electrode of the tenth transistor T10 is electrically connected to the first low voltage terminal VGL;

The carry signal output circuit 30 includes an eleventh transistor T11, a twelfth transistor T12 and a fourth capacitor C4;

The gate electrode of the eleventh transistor T11 is electrically connected to the first node Q, the drain electrode of the eleventh transistor T11 is electrically connected to the first high voltage terminal VGH, and the source electrode of the eleventh transistor T11 is electrically connected to the carry signal output terminal CR(n);

The gate electrode of the twelfth transistor T12 is electrically connected to the second node QB, the drain electrode of the twelfth transistor T12 is electrically connected to the carry signal output terminal CR(n), and the source electrode of the twelfth transistor T12 is electrically connected to the first low voltage terminal VGL;

A first end of the fourth capacitor C4 is electrically connected to the first node Q, and a second end of the fourth capacitor C4 is electrically connected to the carry signal output terminal CR(n).

In at least one embodiment of the voltage supply circuit shown in FIG. 13, all transistors are NMOS transistors, but not limited thereto.

In FIG. 13, Cgs is the gate-source parasitic capacitor of T13.

In the voltage supply circuit shown in FIG. 13, the structure of the driving voltage output circuit 14 is simplified, and the driving circuit output circuit 14 only includes the thirteenth transistor controlled by the second node QB. The driving circuit output circuit 14 is not controlled by the first node Q, so the structure of the first node control circuit 11 can be simplified, so that the first node control circuit 11 only uses one stage of pull-up node.

At least one embodiment of the voltage supply circuit shown in FIG. 13 of the present disclosure can be applied to a display panel with a plurality of data lines, and at least two columns of pixel circuits in the display panel share one data line. When the data writing-in transistor in the pixel circuit is turned on, the data line electrically connected to the data writing-in transistor is in a floating state for a period of time. At this time, if the driving voltage output terminal provides a low voltage signal, the potential of the second electrode of the driving transistor in the pixel circuit is affected, so it is necessary to control the driving voltage output terminal to be in a floating state. If it is necessary to control the driving voltage output terminal to be in a floating state in a specific period of time, then the driving voltage output terminal cannot be connected with too many transistors, so as to reduce the parasitic capacitance connected to the same driving voltage output terminal, the thirteenth transistor can be set in the display area, at least two pixel circuits share one thirteenth transistor and one driving voltage output terminal, or each pixel circuit is electrically connected to one thirteenth transistor and one driving voltage output terminal, so as to reduce parasitic capacitance of the driving voltage output terminal.

Figure 14:
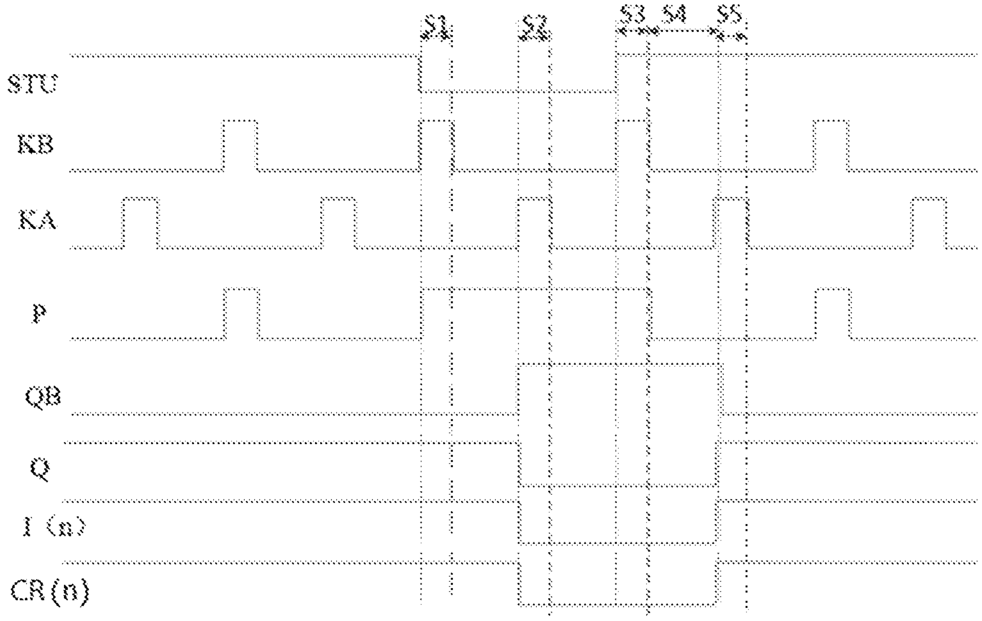
FIG. 14 is a timing diagram of the voltage supply circuit shown in FIG. 13.

As shown in FIG. 14, when the voltage supply circuit shown in FIG. 13 is in operation, the voltage supply period includes a first phase S1, a second phase S2, a third phase S3, a fourth phase S4 and a fifth phase S5 that are set successively;

In the first phase S1, STU provides a low voltage signal, KB provides a high voltage signal, KA provides a low voltage signal, T1 is turned off, T2 is turned off, T3 is tuned off, T6 is turned on, T7 is turned off, the potential of the first control node P is a high voltage, T3 is turned on, T4 is turned off, the potential of the first node Q is maintained at a high voltage, T10 is turned on, the potential of QB is a low voltage, T11 is turned on, T12 and T13 are turned off, and CR(n) outputs a high voltage signal;

In the second phase S2, STU provides a low voltage signal, KB provides a low voltage signal, KA provides a high voltage signal, T1 is turned off, T2 is turned on, T6 and T7 are turned off the potential of the first control node P is maintained at a high voltage, and T8 and T9 are turned on, the potential of the second node QB is a high voltage, T3 is turned on, T4 is turned on, the potential of the first node Q is a low voltage; T11 is turned off, T12 and T13 are turned on, CR(n) outputs a low voltage signal, I(n) is connected to the initial voltage terminal V01, V01 provides a low voltage signal, and I(n) outputs a low voltage signal;

In the third phase S3, STU provides a high voltage signal, KB provides a high voltage signal, KA provides a low voltage signal, T1 is turned on, T2 is turned off, T6 is turned on, T7 is turned on, the potential of the first control node P is a high voltage, and T8 is turned on, T9 is turned off, the potential of the first node Q is maintained at a low voltage, the potential of the second node QB is maintained at a high voltage, T11 is turned off, T12 and T13 are turned on, CR(n) outputs a low voltage signal, I(n) is connected to the initial voltage terminal V01, V01 provides a low voltage signal, and I(n) outputs a low voltage signal;

In the fourth phase S4, STU provides a high voltage signal, KB provides a low voltage signal, KA provides a low voltage signal, T1 is turned on, T2 is turned off, T3 is turned off, the potential of the first node Q is maintained at a low voltage, and T6 is turned off. T7 is turned on, the potential of the first control node P is a low voltage. T8 is turned off, T9 is turned off, T4 is turned off, the potential of the first node Q is maintained at a low voltage, the potential of the second node QB is maintained at a high voltage, and T11 is turned off, T12 and T13 are turned on, CR(n) outputs a low voltage signal, I(n) is connected to the initial voltage terminal V01, V01 provides a low voltage signal, and I(n) outputs a low voltage signal;

In the fifth phase S5, STU provides a high voltage signal, KB provides a low voltage signal, KA provides a high voltage signal, T1 is turned on, T2 is turned on, the potential of the first node Q is a high voltage, T7 is turned on, the first control node P is connected to KB, the potential of the first control node P is a low voltage, T8 is turned off, T9 is turned on, T10 is turned on, the potential of the second node QB is a low voltage, T11 is turned on, T12 and T13 are turned off, CR(n) outputs a high voltage signal.

Figure 24:
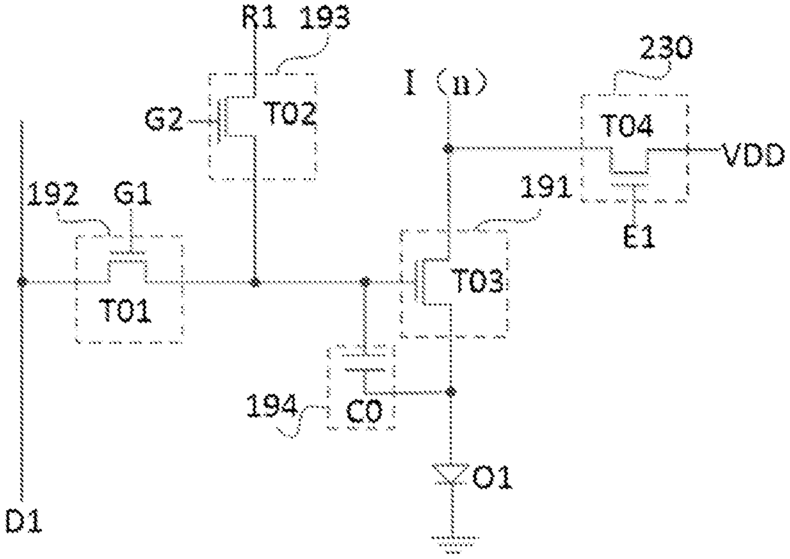
FIG. 24 is a circuit diagram of the pixel circuit according to at least one embodiment of the present disclosure.

The voltage supply circuit shown in FIG. 13 of at least one embodiment of the present disclosure needs to be used in conjunction with the pixel circuit shown in FIG. 24. The pixel circuit shown in FIG. 24 includes a driving control circuit, the driving control circuit includes a driving control transistor T04; the gate electrode of the driving control transistor T04 is electrically connected to the light emitting control line E1, the source electrode of the driving control transistor T04 is electrically connected to the second high voltage terminal VDD, and the source electrode of the driving control transistor T04 is electrically connected to the driving voltage output terminal I(n); when the light emitting control line E1 controls T04 to be turned on, the second high voltage terminal VDD is connected to I(n).

Figure 15:
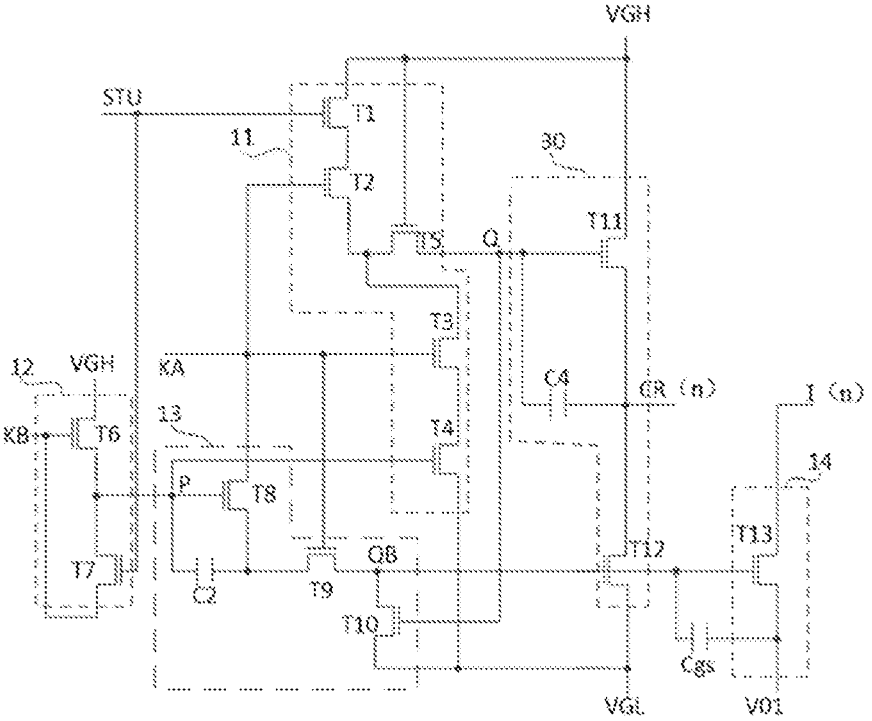
FIG. 15 is a circuit diagram of a voltage supply circuit according to at least one embodiment of the present disclosure.

The difference between the voltage supply circuit shown in FIG. 15 of at least one embodiment of the present disclosure and the voltage supply circuit shown in FIG. 13 of at least one embodiment of the present disclosure is that:

The first node control circuit 11 further includes a fifth transistor T5;

The source electrode of the second transistor T2 and the drain electrode of the third transistor T3 are electrically connected to the first node Q through the fifth transistor T5;

The gate electrode of the fifth transistor T5 is electrically connected to the first high voltage terminal VGH, and the drain electrode of the fifth transistor T5 is respectively connected to the source electrode of the second transistor T2 and the drain electrode of the third transistor T3, The source electrode of the fifth transistor T5 is electrically connected to the first node Q. In the voltage supply circuit shown in FIG. 15, the first node control circuit 11 further includes the fifth transistor T5, the gate electrode of the fifth transistor T5 is electrically connected to the first high voltage terminal VGH, the first transistor T1 and the second transistor T2 included in the first node control circuit 11 are turned off, the fifth transistor T5 can be completely turned off (when the gate-source voltage of the fifth transistor T5 is 0, the fifth transistor T5 is completely turned off), thereby preventing leakage current from affecting the potential of the first node Q.

Figure 16:
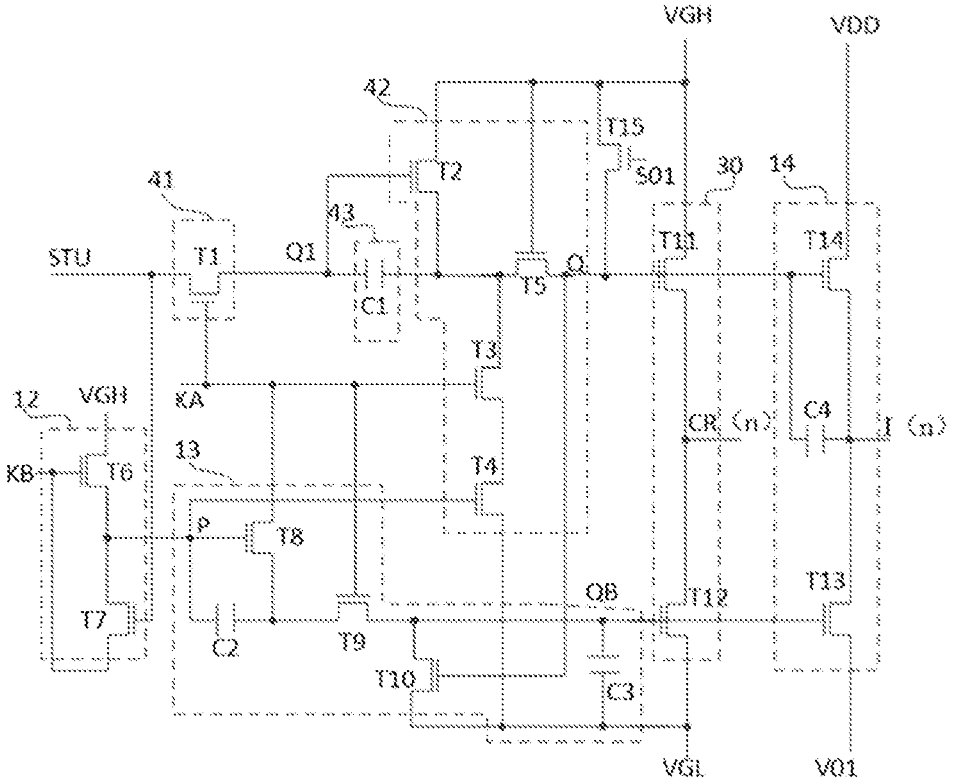
FIG. 16 is a circuit diagram of a voltage supply circuit according to at least one embodiment of the present disclosure.

The difference between the voltage supply circuit shown in FIG. 16 of at least one embodiment of the present disclosure and the voltage supply circuit shown in FIG. 10 of at least one embodiment of the present disclosure is that: the voltage supply circuit shown in FIG. 16 further includes a fifteenth transistor T15;

The gate electrode of the fifteenth transistor T15 is connected to the reset control terminal SOI, the drain electrode of the fifteenth transistor T15 is electrically connected to the first high voltage terminal VGH, and the source electrode of the fifteenth transistor T15 It is electrically connected to the first node Q.

In at least one embodiment of the voltage supply circuit shown in FIG. 16, T15 is an NMOS transistor, but not limited thereto.

At least one embodiment of the voltage supply circuit shown in FIG. 16 of the present disclosure is in operation, when the display panel is just turned on, the reset control terminal S01 can provide a high voltage signal to control T15 to be turned on, so that the potential of the first node Q is set to a high voltage, and the potential of the second node QB is controlled to be a low voltage through T10 to ensure the normal use of the voltage supply circuit.

In at least one embodiment of the present disclosure, on the basis of the voltage supply circuit shown in FIG. 12, FIG. 13, and FIG. 15, the fifteen transistor T15 is added, so that when the display panel is just turned on, the potential of the first node Q and the potential of the second node QB are reset.

The voltage supply method described in the embodiment of the present disclosure is applied to the above-mentioned voltage supply circuit, and the voltage supply period includes the first phase, the second phase, the third phase, the fourth phase and the fifth phase set successively; the voltage supply methods include:

In the first phase, the first node control circuit controlling the potential of the first node to be the first level, the first control node control circuit controlling the potential of the first control node to be the first level, and the second node control circuit controlling the potential of the second node to be the second level;

In the second phase, the first node control circuit controlling the potential of the first node to be the second level, the first control node control circuit controlling the potential of the first control node to be the first level, and the second node control circuit controlling the potential of the second node to be the first level, and the driving voltage output circuit controlling the driving voltage output terminal to output the initial voltage under the control of the potential of the second node;

In the third phase, the first node control circuit controlling the potential of the first node to be the second level, the first control node control circuit controlling the potential of the first control node to be the first level, and the second node control circuit controlling the potential of the second node to be the first level, and the driving voltage output circuit controlling the driving voltage output terminal to output the initial voltage under the control of the potential of the second node;

In the fourth phase, the first node control circuit controlling the potential of the first node to be the second level, the first control node control circuit controlling the potential of the first control node to be the second level, and the second node control circuit controlling the potential of the second node to be the first level, and the driving voltage output circuit controlling the driving voltage output terminal to output the initial voltage under the control of the potential of the second node;

In the fifth phase, the first node control circuit controlling the potential of the first node to be the first level, the first control node control circuit controlling the potential of the first control node, and the second node control circuit controlling the potential of the second node to be the second level.

In at least one embodiment of the present disclosure, the first level may be a high level, and the second level may be a low level, but not limited thereto.

Optionally, the driving voltage output circuit is further electrically connected to the first node and the third voltage terminal, and the voltage supply method further includes:

In the first phase and the fifth phase, the driving voltage output circuit controlling to connect the driving voltage output terminal and the third voltage terminal under the control of the potential of the first node.

In at least one embodiment of the present disclosure, the voltage supply circuit further includes a carry signal output circuit; the voltage supply method may further include:

In the first phase and the fifth phase, the carry signal output circuit controlling to connect the carry signal output terminal and the first voltage terminal under the control of the potential of the first node;

In the second phase, the third phase and the fourth phase, the carry signal output circuit controlling to connect the carry signal output terminal and the second voltage terminal under the control of the potential of the second node.

The voltage supply module described in the embodiment of the present disclosure includes a plurality stages of the voltage supply circuits;

The voltage supply circuit includes a carry signal output terminal;

The carry signal output terminal of the voltage supply circuit is electrically connected to the input terminal of an adjacent next stage of voltage supply circuit for providing an input signal to the input terminal of the adjacent next stage of voltage supply circuit.

Figure 17:
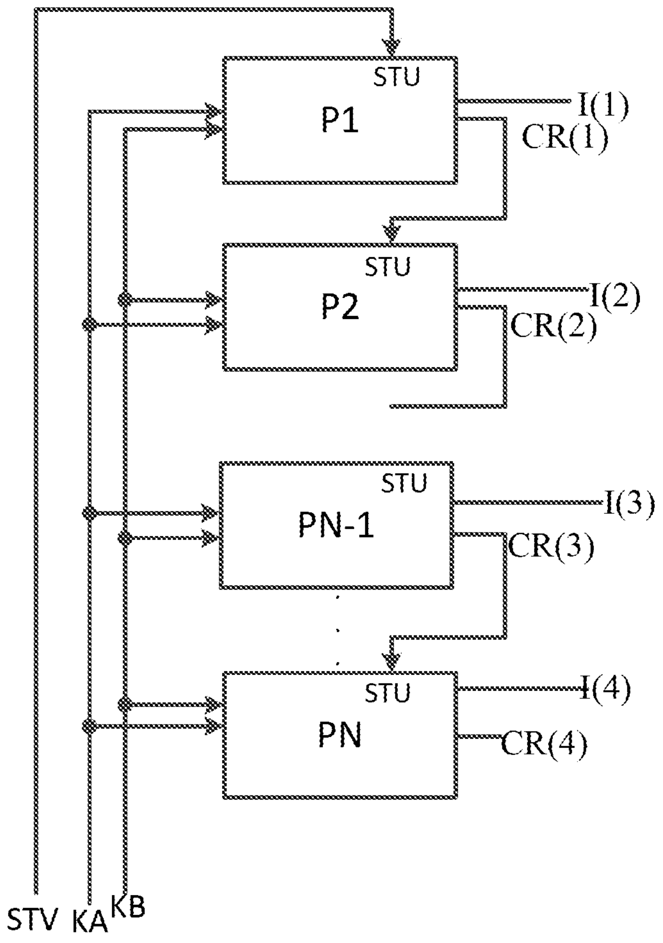
FIG. 17 is a structural diagram of a voltage supply module according to at least one embodiment of the present disclosure.

As shown in FIG. 17, the voltage supply module described in the embodiment of the present disclosure includes a plurality of stages of voltage supply circuits;

In FIG. 17, the one labeled P1 is the first stage of voltage supply circuit, the one labeled P2 is the second stage of voltage supply circuit, the one labeled PN−1 is the (N−1)th stage of voltage supply circuit, and the one labeled PN is Nth stage of voltage supply circuit, where N is an integer greater than 2;

The one labeled KA is the first clock signal terminal, and the one labeled KB is the second clock signal terminal;

The one labeled STU is the input terminal, and the input terminal of the first stage of voltage supply circuit P1 is connected to the start signal STV;

The one labeled CR (1) is the first stage of carry signal output terminal, the one labeled CR (2) is the second stage of carry signal output terminal, and the one labeled CR (N−1) is the (N−1)th stage of carry signal output terminal;

The one labeled IN (1) is the first driving voltage output terminal, the one labeled IN (2) is the second driving voltage output terminal, the one labeled IN (N−1) is the (N−1)th driving voltage output terminal, and the label is IN (N) is the Nth driving voltage output terminal;

The input terminal of the second stage of voltage supply circuit P2 is electrically connected to CR(1), and the input terminal of the Nth stage of voltage supply circuit PN is electrically connected to CR(N−1).

Figure 18:
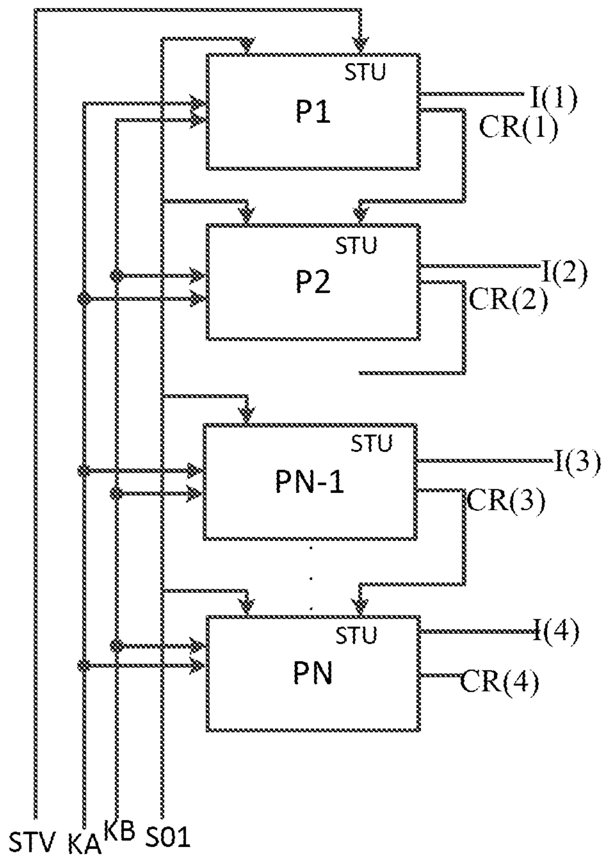
FIG. 18 is a structural diagram of a voltage supply module according to at least one embodiment of the present disclosure.

As shown in FIG. 18, on the basis of the voltage supply module shown in FIG. 17, a reset control terminal S01 is added; each stage of voltage supply circuit is electrically connected to the reset control terminal S01.

The display device described in the embodiment of the present disclosure includes the above-mentioned voltage supply module.

The display device according to at least one embodiment of the present disclosure may further include a plurality of rows and a plurality of columns of pixel circuits; the pixel circuit includes a light emitting element and a driving circuit, a data writing-in circuit, an initialization circuit and a second energy storage circuit;

A first end of the driving circuit is electrically connected to the driving voltage output terminal, a second end of the driving circuit is electrically connected to the light emitting element, and the driving circuit is used to generate the current for driving the light emitting element to emit light under the control of the potential of the control terminal of the driving circuit;

The voltage supply circuit included in the voltage supply module is electrically connected to the driving voltage output terminal, and is used to provide a driving voltage to the driving voltage output terminal;

The data writing-in circuit is electrically connected to the scanning line, the data line and the control end of the driving circuit, and is used to control to write the data voltage on the data line into the control end of the driving circuit under the control of the scanning signal provided by the scanning line;

The initialization circuit is electrically connected to the initialization control line, the reference voltage terminal, and the control end of the driving circuit, and is used to write the reference voltage provided by the reference voltage terminal into the control end of the driving circuit under the control of the initialization control signal provided by the initialization control line;

The second energy storage circuit is electrically connected to the control end of the driving circuit for storing electric energy.

In at least one embodiment of the present disclosure, the pixel circuit may include a light emitting element, a driving circuit, a data writing-in circuit, an initialization circuit, and a second energy storage circuit; the data writing-in circuit performs data voltage writing, and the initialization circuit is configured to initialize the potential of the control end of the driving circuit, the driving circuit is used to generate a current for driving the light emitting element to emit light.

Figure 19:
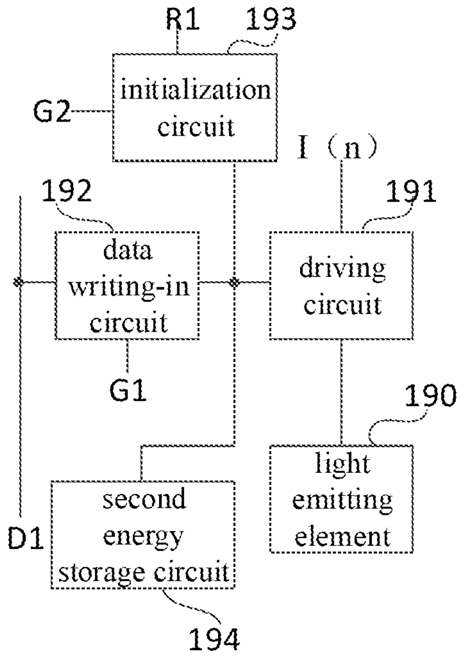
FIG. 19 is a structural diagram of a pixel circuit in a display device according to at least one embodiment of the present disclosure.

As shown in FIG. 19, at least one embodiment of the pixel circuit may include a light emitting element 190, a driving circuit 191, a data writing-in circuit 192, an initialization circuit 193 and a second energy storage circuit 194;

The first end of the driving circuit 191 is electrically connected to the driving voltage output terminal I(n), the second end of the driving circuit 191 is electrically connected to the light emitting element 190, and the driving circuit 191 is configured to generate a current for driving the light emitting element 190 to emit light under the control of the potential of the control end of the driving circuit 191;

The voltage supply circuit included in the voltage supply module is electrically connected to the driving voltage output terminal I(n), and is used to provide a driving voltage to the driving voltage output terminal I(n);

The data writing-in circuit 192 is electrically connected to the scanning line G1, the data line D1 and the control end of the driving circuit 191, and is used to control to write the data voltage on the data line D1 into the control end of the driving circuit 191 under the control of the scanning signal provided by the scanning line GL;

The initialization circuit 193 is electrically connected to the initialization control line G2, the reference voltage terminal R1 and the control end of the driving circuit 191, and is used to write the reference voltage Vr provided by the reference voltage terminal R1 into the control end of the driving circuit 191 under the control of the initialization control signal provided by the initialization control line G2;

The second energy storage circuit 194 is electrically connected to the control end of the driving circuit 191 for storing electric energy.

In at least one embodiment of the present disclosure, the light emitting element may be an organic light emitting diode, but not limited thereto.

The embodiments of the present disclosure provide a pixel circuit suitable for extremely high pixel density (PPI) and capable of internal compensation, especially suitable for medium and large size OLED displays.

The transistors in the pixel circuit used in the display device described in the embodiments of the present disclosure may all be N-type metal-oxide-semiconductor (NMOS) transistors, and the NMOS process is sufficient, and the process is simple.

When at least one embodiment of the pixel circuit shown in FIG. 19 is in operation, the display period may include an initialization phase, a compensation phase, a data writing-in phase, and a light emitting phase that are set successively;

In the initialization phase, I(n) provides a low voltage signal, and the initialization circuit 193 writes the reference voltage Vr into the control end of the driving circuit 191 under the control of the initialization control signal;

In the compensation phase, I(n) provides a high voltage signal, and the initialization circuit 193 writes the reference voltage Vr into the control end of the driving circuit 191 under the control of the initialization control signal, so that the driving transistor included in the driving transistor 191 can be turned on, and VDD charges the second energy storage circuit 193 through the turned-on driving transistor until the potential of the second end of the driving circuit 191 becomes Vr−Vth, wherein Vth is the threshold voltage of the driving transistor;

In the data writing-in phase, the data writing-in circuit 192 writes the data voltage Vdata on the data line D1 into the control end of the driving circuit 191 under the control of the scanning signal, and the potential of the second end of the driving circuit 191 is maintained at Vr−Vth;

In the light emitting phase, the data writing-in circuit 191 stops writing the data voltage value to the control end of the driving circuit 191, and the driving circuit 191 drives the light emitting element 190 to emit light.

Figure 20:
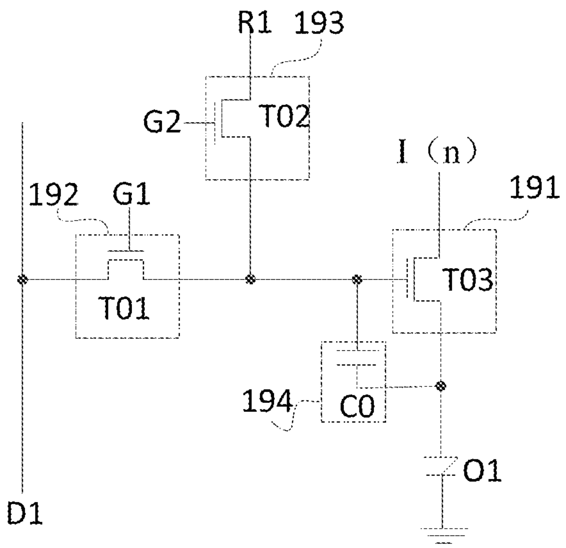
FIG. 20 is a circuit diagram of the pixel circuit according to at least one embodiment of the present disclosure.

As shown in FIG. 20, on the basis of the pixel circuit shown in FIG. 19, the light emitting element is an organic light emitting diode O1, the driving circuit 191 includes the driving transistor T03, the data writing-in circuit 192 includes a data writing-in transistor T01, the initialization circuit 193 includes an initialization transistor T02, and the second energy storage circuit 194 includes a storage capacitor C0;

The gate electrode of T01 is electrically connected to the scanning line G1, the drain electrode of T01 is electrically connected to the data line D1, and the source electrode of T01 is electrically connected to the gate electrode of T03;

The gate electrode of T02 is electrically connected to the initialization control line G2, the drain electrode of T02 is electrically connected to the reference voltage terminal R1, and the source electrode of T02 is electrically connected to the gate electrode of T03;

The drain electrode of T03 is electrically connected to the driving voltage output terminal I(n), and the source electrode of T03 is electrically connected to the anode of O1;

The cathode of O1 is grounded.

In at least one embodiment of the pixel circuit shown in FIG. 20, T01, T02 and T03 may be n-type transistors, but not limited thereto.

At least one embodiment of the pixel circuit shown in FIG. 20 may be an nth row of pixel circuits included in the display panel, where n is a positive integer.

Figure 21:
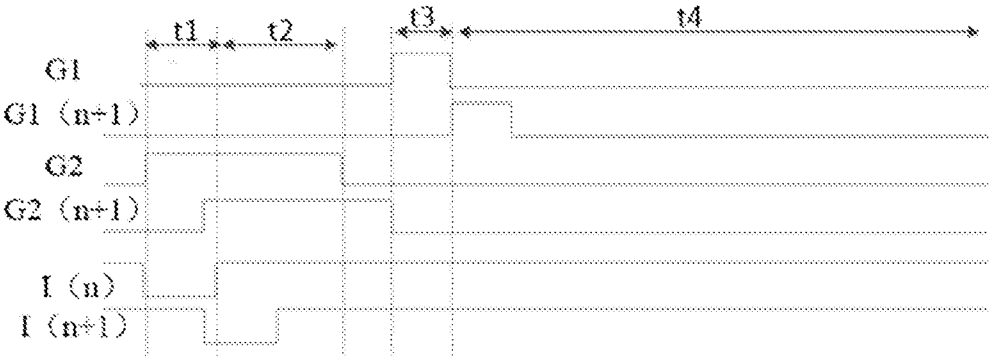
FIG. 21 is a timing diagram of the pixel circuit shown in FIG. 20.

As shown in FIG. 21, when the pixel circuit shown in FIG. 20 is in operation, the display period may include an initialization phase t1, a compensation phase t2, a data writing-in phase t3, and a light emitting phase t4 which are set successively;

In the initialization phase t1, G1 provides a low voltage signal, G2 provides a high voltage signal, I(n) provides a low voltage signal, T01 is turned off, and T02 is turned on to write the reference voltage Vr provided by R1 into the gate electrode of T03;

In the compensation phase t2, G1 provides a low voltage signal, G2 provides a high voltage signal, I(n) provides a high voltage signal, T01 is turned off, and T02 is turned on to write the reference voltage Vr provided by R1 into the gate electrode of T03, and T03 is turned on, VDD charges C0 through T03 to increase the potential of the gate electrode of T03 until the potential of the gate electrode of T03 becomes Vr−Vth, wherein Vth is the threshold voltage of T03;

In the data writing-in phase t3, I(n) provides a high voltage signal, G1 provides a high voltage signal, G2 provides a low voltage signal, T01 is turned on, and the data line D1 provides the data voltage Vdata to write the data voltage Vdata into the gate electrode of T03, the potential of the source electrode of T03 is maintained at Vr−Vth (due to the large intrinsic capacitance of O1, when the data voltage is written, the coupling effect of C0 is negligible);

In the light emitting phase t4, I(n) provides a high voltage signal, G1 provides a low voltage signal, G2 provides a low voltage signal, T03 drives O1 to emit light, at this time the gate-source voltage of T03 is Vgs=Vdata−Vr+Vth, then the driving current of T03 is independent of Vth.

In FIG. 21, the label G1 (n+1) corresponds to the scanning signal provided by the (n+1)th row of scanning line, and the label G2 (n+1) corresponds to the initialization control signal provided by the (n+1)th row of initialization control line.

Figure 22:
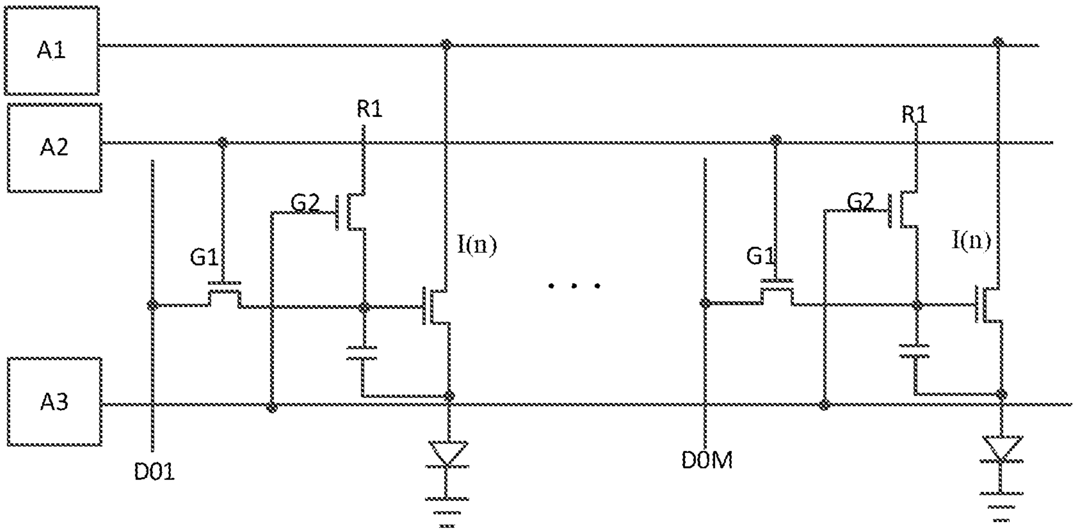
FIG. 22 is a schematic diagram of the connection relationship among the the nth row of pixel circuit and the voltage supply circuit A1, the scanning signal generation circuit A2 and the initialization control signal generation circuit A3.

FIG. 22 shows the leftmost pixel circuit included in the nth row of pixel circuits, and the rightmost pixel circuit included in the nth row of pixel circuits;

In FIG. 22, the one labeled D01 is the first column of data line, the one labeled DOM is the Mth column of data line, and M is an integer greater than 1; the one labeled Vr is the reference voltage;

In FIG. 22, the one marked A1 is a voltage supply circuit, the one marked A2 is a scanning signal generation circuit, and the one marked A3 is an initialization control signal generation circuit; the voltage supply circuit A1 is used to provide a driving voltage to I(n); the scanning signal generation circuit A2 is electrically connected to G1 for providing the scanning signal, and the initialization control signal generation circuit A3 is electrically connected to G2 for providing the initialization control signal.

Optionally, the pixel circuit further includes a driving control circuit; the driving control circuit is respectively electrically connected to the light emitting control line, the first end of the driving circuit and the fourth voltage terminal, and is used to write the fourth voltage signal provided by the fourth voltage terminal into the first end of the driving circuit under the control of the light emitting control signal provided by the light emitting control line.

In at least one embodiment of the present disclosure, the fourth voltage terminal may be the second high voltage terminal, but not limited thereto.

Figure 23:
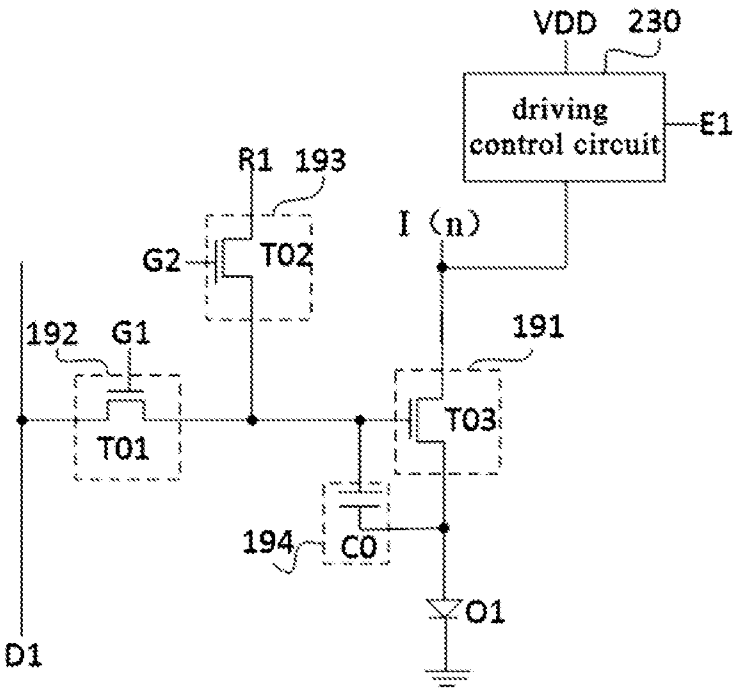
FIG. 23 is a circuit diagram of the pixel circuit according to at least one embodiment of the present disclosure.

As shown in FIG. 23, on the basis of the pixel circuit shown in FIG. 20, the pixel circuit further includes a driving control circuit 230;

The driving control circuit 230 is electrically connected to the light emitting control line E1, the first end of the driving circuit 191, and the second high voltage terminal VDD, and is used to write the second high voltage signal provided by the second high voltage terminal VDD into the first end of the driving circuit 191 under the control of the light emitting control signal provided by the light emitting control line E1.

In specific implementation, the driving control circuit may include a driving control transistor;

The control electrode of the driving control transistor is electrically connected to the light emitting control line, the first electrode of the driving control transistor is electrically connected to the first electrode of the driving transistor, and the second electrode of the driving control transistor is connected to the fourth voltage terminal.

As shown in FIG. 24, on the basis of the pixel circuit shown in FIG. 23, the driving control circuit 230 includes a driving control transistor T04;

The gate electrode of T04 is electrically connected to the light emitting control line E1, the drain electrode of T04 is electrically connected to the drain electrode of T03, and the source electrode of T04 is electrically connected to the second high voltage terminal VDD.

In at least one embodiment of the pixel circuit shown in FIG. 24, T01, T02, T03 and T04 are all n-type transistors, but not limited thereto.

At least one embodiment of the pixel circuit shown in FIG. 24 may be an nth row of pixel circuits included in the display panel, where n is a positive integer.

When the display panel including the pixel circuit shown in FIG. 24 is in operation, at least two columns of pixel circuits included in the display panel can share one data line, when the data writing-in transistor in the pixel circuit is turned on, the data line electrically connected to the data writing-in transistor is in a floating state for a period of time, at this time, if the driving voltage output terminal provides a low voltage signal, the potential of the second electrode of the driving transistor in the pixel circuit will be affected, so it is necessary to control the output end of the driving voltage to be in a floating state.

Figure 25:
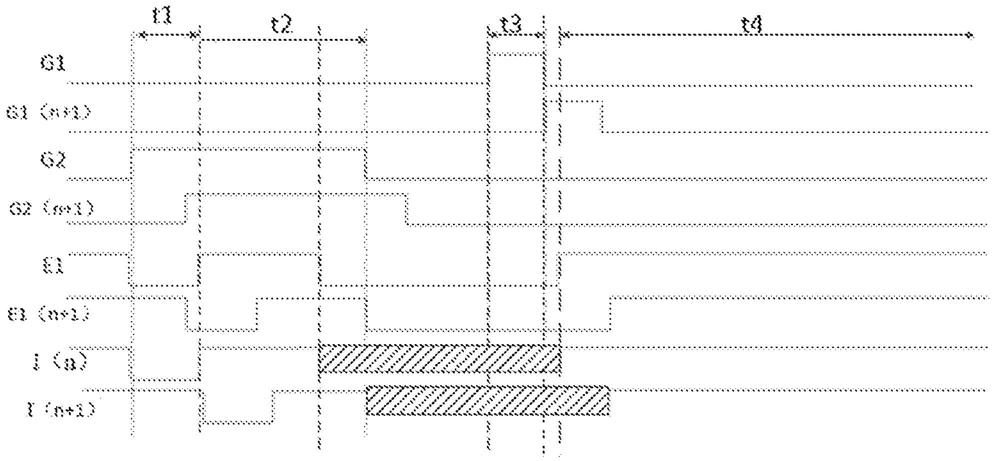
FIG. 25 is a timing diagram of the pixel circuit shown in FIG. 24.

As shown in FIG. 25, when the pixel circuit shown in FIG. 24 of at least one embodiment of the present disclosure is in operation, the display period may include an initialization phase t1, a compensation phase t2, a data writing-in phase t3, and a light emitting phase t4;

In the initialization phase t1, G1 provides a low voltage signal, G2 provides a high voltage signal, I(n) provides a low voltage signal, T01 is turned off, and T02 is turned on to write the reference voltage Vr provided by R1 into the gate electrode of T03; E1 provides a low voltage signal, T04 is turned off;

In the compensation phase t2, G1 provides a low voltage signal, G2 provides a high voltage signal, E1 provides a high voltage signal, T04 is turned on, the drain electrode of T03 is connected to VDD, I(n) provides a high voltage signal, T01 is turned off and T02 is turned on to write the reference voltage Vr provided by R1 into the gate electrode of T03, T03 is turned on, and VDD charges C0 through T03 to increase the potential of the gate electrode of T03 until the potential of the gate electrode of T03 becomes Vr−Vth, wherein, Vth is the threshold voltage of T03;

In the data writing-in phase t3, G1 provides a high voltage signal, G2 provides a low voltage signal, E1 provides a low voltage signal, I(n) is in a floating state, T01 is turned on, and the data line D1 provides the data voltage Vdata to write the data voltage Vdata into the gate electrode of T03, the potential of the source electrode of T03 is maintained at Vr−Vth (due to the large intrinsic capacitance of O1, when the data voltage is written, the coupling effect of C0 is negligible);

In the light-emitting phase t4, E1 provides a high voltage signal, T04 is turned on, the drain electrode of T03 is connected to VDD, I(n) provides a high voltage signal, G1 provides a low voltage signal, G2 provides a low voltage signal, and T03 drives O1 to emit light. At this time, the gate-source voltage of T03 is Vgs=Vdata-Vr+Vth, and the driving current of T03 is irrelevant to Vth.

In the time period corresponding to the oblique line in FIG. 25, I(n) and I(n+1) can be in a floating state, but not limited thereto.

In FIG. 25, the label G1 (n+1) corresponds to the scanning signal provided by the (n−1)th row of the scanning line, and the label G2 (n+1) corresponds to the initialization control signal provided by the (n+1)th row of the initialization control line, the label E1(n+1) is the (n+1)th row of light emitting control line, and the label I(n+1) is the (n+1)th driving voltage output terminal.

In at least one embodiment of the present disclosure, the nth stage of voltage supply circuit in the voltage supply module may include at least two thirteenth transistors and at least two nth stage of driving voltage output terminals, and the at least two thirteenth transistors and the pixel circuit are both arranged in the display area; the devices included in the nth stage of voltage supply circuit other than the thirteenth transistor are all arranged in the peripheral area; n is a positive integer;

The control electrode of the thirteenth transistor is electrically connected to the corresponding second node, the first electrode of the thirteenth transistor is electrically connected to the corresponding nth stage of driving voltage output terminal, and the second electrode of the thirteenth transistor is electrically connected to the initial voltage terminal;

Each of the nth stage of driving voltage output terminals is electrically connected to the first end of the driving circuit included in the at least one pixel circuit located in the nth row, and is configured to provide a corresponding nth stage of driving voltage for the first end of the driving circuit included in the at least one pixel circuit located in the nth row.

In a specific implementation, the thirteenth transistor and the driving voltage output terminal included in the voltage supply circuit may be arranged in the display area, and at least two pixel circuits share one thirteenth transistor and one driving voltage output terminal, or each pixel circuit is electrically connected to one thirteenth transistor and one driving voltage output terminal to reduce the parasitic capacitance of the driving voltage output terminal, so that the display panel can work normally when the driving voltage output terminal is in a floating state.

Optionally, the driving circuit includes a driving transistor, the data writing-in circuit includes a data writing-in transistor, the initialization circuit includes an initialization transistor, the second energy storage circuit includes a storage capacitor; the driving control circuit includes a driving control transistor;

A control electrode of the data writing-in transistor is electrically connected to the scanning line, a first electrode of the data writing-in transistor is electrically connected to the data line, and a second electrode of the data writing-in transistor is connected to the control electrode of the driving transistor;

A control electrode of the initialization transistor is electrically connected to the initialization control line, a first electrode of the initialization transistor is electrically connected to the reference voltage terminal, and a second electrode of the initialization transistor is electrically connected to the control electrode of the driving transistor;

A first end of the storage capacitor is electrically connected to the control electrode of the driving transistor, the storage capacitor is electrically connected to the first electrode of the light-emitting element; the second electrode of the light-emitting element is electrically connected to the fourth voltage terminal;

A first electrode of the driving transistor is electrically connected to the driving voltage output terminal, and the second electrode of the driving transistor is electrically connected to the first electrode of the light emitting element;

A control electrode of the driving control transistor is electrically connected to the light emitting control line, a first electrode of the driving control transistor is electrically connected to the first electrode of the driving transistor, and a second electrode of the driving control transistor is connected to the fourth voltage terminal;

The driving transistor, the data writing-in transistor, the initialization transistor and the driving control transistor are all n-type transistors.

Figure 26:
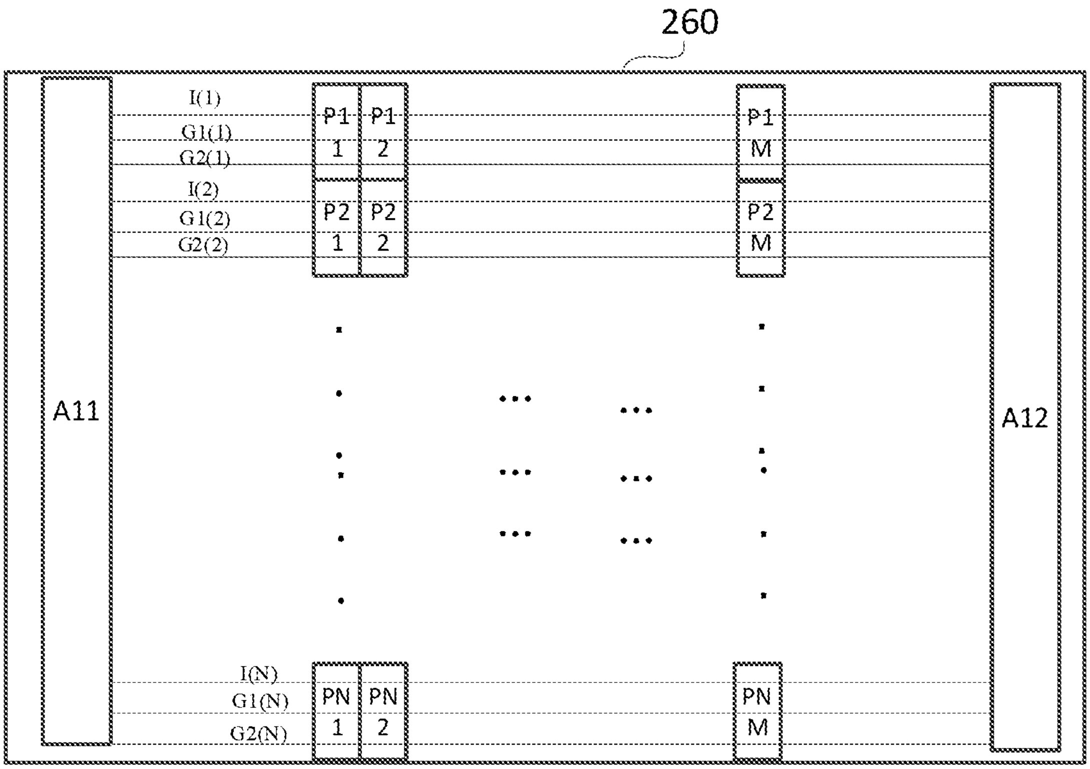
FIG. 26 is a schematic diagram of a display panel included in a display device according to at least one embodiment of the present disclosure.

As shown in FIG. 26, the one labeled P11 is the first row and the first column of pixel circuit, the one labeled P12 is the first row and the second column of pixel circuit, and the one labeled P1M is the first row and the Mth column of pixel circuit, and M is an integer greater than 1;

The one labeled P21 is the second row and the first column of pixel circuit, the one labeled P22 is the second row and the second column of pixel circuit, and the one labeled P2M is the second row and the Mth column of pixel circuit;

The one labeled PN1 is the Nth row and the first column of pixel circuit, the one labeled PN2 is the Nth row and the second column of pixel circuit, and the one labeled PNM is the Nth row and the Mth column of pixel circuit; N is an integer greater than 2;

In FIG. 26, the one marked A11 is the first GOA (Gate On Array, gate driving circuit installed on the array substrate), the one marked A12 is the second GOA circuit; the one marked 260 is the display panel;

The one labeled I(1) is the first row of driving voltage output terminal, the one labeled I(2) is the second row of driving voltage output terminal, and the one labeled I(N) is the Nth row of driving voltage output terminal;

The one labeled G1 (1) is the first row of scanning line, the one labeled G1 (2) is the second row of scanning line, and the one labeled G1 (N) is the Nth row of scanning line;

The one labeled G2 (1) is the first row of initialization control line, the one labeled G2 (2) is the second row of initialization control line, and the one labeled G2 (N) is the Nth row of initialization control line;

The first GOA circuit A11 and the second GOA circuit A12 provide the first row of driving voltage for I(1), provide the second row of driving voltage for I(2), provide the Nth row of driving voltage for I(N), provide the first row of scanning signal for G1(1), provide the second row of scanning signal for G1(2), provide the Nth row of scanning signal for G1(N), provide the first row of the initialization control signal for G2(1), provide the second row of the initialization control signal for G2(2), and provide the Nth row of the initialization control signal for G2(N).

The display device provided by the embodiments of the present disclosure may be any product or component with a display function, such as a mobile phone, a tablet computer, a television, a monitor, a notebook computer, a digital photo frame, a navigator, and the like.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A voltage supply circuit, comprising a first node control circuit, a first control node control circuit, a second node control circuit and a driving voltage output circuit, wherein, the first node control circuit is electrically connected to a first node, an input terminal, a first clock signal terminal, a first control node, a first voltage terminal and a second voltage terminal, and is configured to control a potential of the first node according to a first voltage signal provided by the first voltage terminal and a second voltage signal provided by the second voltage terminal under the control of an input signal provided by the input terminal, a first clock signal provided by the first clock signal terminal and a potential of the first control node;

the first control node control circuit is electrically connected to the first control node, the input terminal and a second clock signal terminal respectively, is configured to control a potential of the first control node under the control of a second clock signal provided by the second clock signal terminal and the input signal;

the second node control circuit is electrically connected to a second node, the first control node, the first clock signal terminal, the first node and the second voltage terminal respectively, is configured to control a potential of the second node according to the first clock signal and the second voltage signal under the control of the potential of the first node, the potential of the first control node and the first clock signal;

the driving voltage output circuit is electrically connected to the second node, the driving voltage output terminal and the initial voltage terminal respectively, and is configured to control the driving voltage output terminal to output a driving voltage according to an initial voltage provided by the initial voltage terminal under the control of the potential of the second node;

wherein the first node control circuit comprises a first transistor, a second transistor, a third transistor and a fourth transistor;

a control electrode of the first transistor is electrically connected to the input terminal, a first electrode of the first transistor is electrically connected to the first voltage terminal, and a second electrode of the first transistor is electrically connected to a first electrode of the second transistor;

a control electrode of the second transistor is electrically connected to the first clock signal terminal, and a second electrode of the second transistor is electrically connected to the first node;

a control electrode of the third transistor is electrically connected to the first clock signal terminal, a first electrode of the third transistor is electrically connected to the first node, and a second electrode of the third transistor is electrically connected to a first electrode of the fourth transistor;

a control electrode of the fourth transistor is electrically connected to the first control node, and a second electrode of the fourth transistor is electrically connected to the second voltage terminal.

2. The voltage supply circuit according to claim 1, wherein the driving voltage output circuit is further electrically connected to the first node and the third voltage terminal, is configured to control the driving voltage output terminal to be electrically connected to the third voltage terminal under the control of the potential of the first node.

3. The voltage supply circuit according to claim 2, wherein the driving voltage output circuit comprises a thirteenth transistor, a fourteenth transistor and a fourth capacitor;

a control electrode of the fourteenth transistor is electrically connected to the first node, a first electrode of the fourteenth transistor is electrically connected to the third voltage terminal, and a second electrode of the fourteenth transistor is electrically connected to the driving voltage output terminal;

a control electrode of the thirteenth transistor is electrically connected to the second node, a first electrode of the thirteenth transistor is electrically connected to the driving voltage output terminal, and a second electrode of the thirteenth transistor is electrically connected to the initial voltage terminal;

a first end of the fourth capacitor is electrically connected to the first node, and a second end of the fourth capacitor is electrically connected to the driving voltage output terminal.

4. The voltage supply circuit according to claim 1, further comprising a carry signal output circuit; wherein the carry signal output circuit is respectively electrically connected to the carry signal output terminal, the first node, the second node, the first voltage terminal and the second voltage terminal, is configured to control the carry signal output terminal to output a carry signal according to the first voltage signal and the second voltage signal under the control of the potential of the first node and the potential of the second node.

5. The voltage supply circuit according to claim 4, wherein the carry signal output circuit comprises an eleventh transistor, a twelfth transistor and a fourth capacitor;

a control electrode of the eleventh transistor is electrically connected to the first node, a first electrode of the eleventh transistor is electrically connected to the first voltage terminal, and a second electrode of the eleventh transistor is electrically connected to the carry signal output terminal;

a control electrode of the twelfth transistor is electrically connected to the second node, a first electrode of the twelfth transistor is electrically connected to the carry signal output terminal, and a second electrode of the twelfth transistor is electrically connected to the second voltage terminal.

6. The voltage supply circuit according to claim 1, wherein the first node control circuit further comprises a fifth transistor;

the second electrode of the second transistor and the first electrode of the third transistor are electrically connected to the first node through the fifth transistor;

a control electrode of the fifth transistor is electrically connected to the first voltage terminal, and a first electrode of the fifth transistor is electrically connected to the second electrode of the second transistor and the first electrode of the third transistor respectively, a second electrode of the fifth transistor is electrically connected to the first node.

7. The voltage supply circuit according to claim 1, wherein the first control node control circuit comprises a sixth transistor and a seventh transistor;

a control electrode of the sixth transistor is electrically connected to the second clock signal terminal, a first electrode of the sixth transistor is electrically connected to the first voltage terminal or the second clock signal terminal, and a second electrode of the sixth transistor is electrically connected to the first control node;

a control electrode of the seventh transistor is electrically connected to the input terminal, a first electrode of the seventh transistor is electrically connected to the first control node, and a second electrode of the seventh transistor is electrically connected to the second clock signal terminal.

8. The voltage supply circuit according to claim 1, wherein the second node control circuit comprises an eighth transistor, a ninth transistor, a second capacitor and a tenth transistor;

a control electrode of the eighth transistor is electrically connected to the first control node, a first electrode of the eighth transistor is electrically connected to the first clock signal terminal, and a second electrode of the eighth transistor is electrically connected to a first electrode of the ninth transistor;

a first end of the second capacitor is electrically connected to the first control node, and a second end of the second capacitor is electrically connected to the first electrode of the ninth transistor;

a control electrode of the ninth transistor is electrically connected to the first clock signal terminal, and a second electrode of the ninth transistor is electrically connected to the second node;

a control electrode of the tenth transistor is electrically connected to the first node, a first electrode of the tenth transistor is electrically connected to the second node, and a second electrode of the tenth transistor is electrically connected to the second voltage terminal, wherein the second node control circuit further comprises a third capacitor;

a first end of the third capacitor is electrically connected to the second node, and a second end of the third capacitor is electrically connected to the second voltage terminal.

9. The voltage supply circuit according to claim 1, wherein the driving voltage output circuit comprises a thirteenth transistor;

a control electrode of the thirteenth transistor is electrically connected to the second node, a first electrode of the thirteenth transistor is electrically connected to the driving voltage output terminal, and s second electrode of the thirteenth transistor is electrically connected to the initial voltage terminal.

10. A voltage supply method, applied to the voltage supply circuit according to claim 1, wherein a voltage supply period includes a first phase, a second phase, a third phase, a fourth phase and a fifth phase that are set successively; the voltage providing method includes:

in the first phase, the first node control circuit controlling the potential of the first node to be a first level, the first control node control circuit controlling the potential of the first control node to be the first level, and the second node control circuit controlling the potential of the second node to be a second level;

in the second phase, the first node control circuit controlling the potential of the first node to be the second level, the first control node control circuit controlling the potential of the first control node to be the first level, the second node control circuit controlling the potential of the second node to be the first level, and the driving voltage output circuit controlling the driving voltage output terminal to output the initial voltage under the control of the potential of the second node;

in the third phase, the first node control circuit controlling the potential of the first node to be the second level, the first control node control circuit controlling the potential of the first control node to be the first level, the second node control circuit controlling the potential of the second node to be the first level, and the driving voltage output circuit controlling the driving voltage output terminal to output the initial voltage under the control of the potential of the second node;

in the fourth phase, the first node control circuit controlling the potential of the first node to be the second level, the first control node control circuit controlling the potential of the first control node to be the second level, the second node control circuit controlling the potential of the second node to be the first level, and the driving voltage output circuit controlling the driving voltage output terminal to output the initial voltage under the control of the potential of the second node;

in the fifth phase, the first node control circuit controlling the potential of the first node to be the first level, the first control node control circuit controlling the potential of the first control node, and the second node control circuit controlling the potential of the second node to be the second level.

11. The voltage supply method according to claim 10, wherein the driving voltage output circuit is further electrically connected to the first node and the third voltage terminal, and the voltage supply method further includes:

in the first phase and the fifth phase, the driving voltage output circuit controlling to connect the driving voltage output terminal and the third voltage terminal under the control of the potential of the first node; or wherein the voltage supply circuit further comprises a carry signal output circuit; the voltage supply method further comprises:

in the first phase and the fifth phase, the carry signal output circuit controlling to connect the carry signal output terminal and the first voltage terminal under the control of the potential of the first node;

in the second phase, the third phase and the fourth phase, the carry signal output circuit controlling to connect the carry signal output terminal and the second voltage terminal under the control of the potential of the second node.

12. A voltage supply module, comprising a plurality of stages of voltage supply circuits, wherein the voltage supply circuit includes a first node control circuit, a first control node control circuit, a second node control circuit, a driving voltage output circuit and a carry signal output terminal;

the first node control circuit is electrically connected to a first node, an input terminal, a first clock signal terminal, a first control node, a first voltage terminal and a second voltage terminal, and is configured to control a potential of the first node according to a first voltage signal provided by the first voltage terminal and a second voltage signal provided by the second voltage terminal under the control of an input signal provided by the input terminal, a first clock signal provided by the first clock signal terminal and a potential of the first control node;

the first control node control circuit is electrically connected to the first control node, the input terminal and a second clock signal terminal respectively, is configured to control a potential of the first control node under the control of a second clock signal provided by the second clock signal terminal and the input signal;

the second node control circuit is electrically connected to a second node, the first control node, the first clock signal terminal, the first node and the second voltage terminal respectively, is configured to control a potential of the second node according to the first clock signal and the second voltage signal under the control of the potential of the first node, the potential of the first control node and the first clock signal;

the driving voltage output circuit is electrically connected to the second node, the driving voltage output terminal and the initial voltage terminal respectively, and is configured to control the driving voltage output terminal to output a driving voltage according to an initial voltage provided by the initial voltage terminal under the control of the potential of the second node;

wherein the first node control circuit comprises a first transistor, a second transistor, a third transistor and a fourth transistor;

a control electrode of the first transistor is electrically connected to the input terminal, a first electrode of the first transistor is electrically connected to the first voltage terminal, and a second electrode of the first transistor is electrically connected to a first electrode of the second transistor;

a control electrode of the second transistor is electrically connected to the first clock signal terminal, and a second electrode of the second transistor is electrically connected to the first node;

a control electrode of the third transistor is electrically connected to the first clock signal terminal, a first electrode of the third transistor is electrically connected to the first node, and a second electrode of the third transistor is electrically connected to a first electrode of the fourth transistor;

a control electrode of the fourth transistor is electrically connected to the first control node, and a second electrode of the fourth transistor is electrically connected to the second voltage terminal;

the carry signal output terminal of the voltage supply circuit is electrically connected to the input terminal of an adjacent next stage of voltage supply circuit for providing an input signal to the input terminal of the adjacent next stage of voltage supply circuit.

13. A display device comprising the voltage supply module according to claim 12.

14. The display device according to claim 13, further comprising a plurality of rows and a plurality of columns of pixel circuits; wherein the pixel circuit includes a light emitting element and a driving circuit, a data writing-in circuit, an initialization circuit and a second energy storage circuit;

a first end of the driving circuit is electrically connected to the driving voltage output terminal, a second end of the driving circuit is electrically connected to the light emitting element, and the driving circuit is used to generate the current for driving the light emitting element to emit light under the control of a potential of the control terminal of the driving circuit;

the voltage supply circuit included in the voltage supply module is electrically connected to the driving voltage output terminal, and is configured to provide a driving voltage to the driving voltage output terminal;

the data writing-in circuit is electrically connected to a scanning line, a data line and the control end of the driving circuit, and is configured to control to write the data voltage on the data line into the control end of the driving circuit under the control of a scanning signal provided by the scanning line;

the initialization circuit is electrically connected to an initialization control line, a reference voltage terminal, and the control end of the driving circuit, and is configured to write a reference voltage provided by the reference voltage terminal into the control end of the driving circuit under the control of an initialization control signal provided by the initialization control line;

the second energy storage circuit is electrically connected to the control end of the driving circuit for storing electric energy.

15. The display device according to claim 14, wherein the pixel circuit further comprises a driving control circuit; the driving control circuit is respectively electrically connected to the light emitting control line, the first end of the driving circuit and a fourth voltage terminal, and is configured to write a fourth voltage signal provided by the fourth voltage terminal into the first end of the driving circuit under the control of the light emitting control signal provided by the light emitting control line, wherein the driving circuit includes a driving transistor, the data writing-in circuit includes a data writing-in transistor, the initialization circuit includes an initialization transistor, the second energy storage circuit includes a storage capacitor; the driving control circuit includes a driving control transistor;

a control electrode of the data writing-in transistor is electrically connected to the scanning line, a first electrode of the data writing-in transistor is electrically connected to the data line, and a second electrode of the data writing-in transistor is connected to a control electrode of the driving transistor;

a control electrode of the initialization transistor is electrically connected to the initialization control line, a first electrode of the initialization transistor is electrically connected to the reference voltage terminal, and a second electrode of the initialization transistor is electrically connected to the control electrode of the driving transistor;

a first end of the storage capacitor is electrically connected to the control electrode of the driving transistor, the storage capacitor is electrically connected to a first electrode of the light-emitting element; a second electrode of the light-emitting element is electrically connected to the fourth voltage terminal;

a first electrode of the driving transistor is electrically connected to the driving voltage output terminal, and a second electrode of the driving transistor is electrically connected to the first electrode of the light emitting element;

a control electrode of the driving control transistor is electrically connected to the light emitting control line, a first electrode of the driving control transistor is electrically connected to the first electrode of the driving transistor, and a second electrode of the driving control transistor is connected to the fourth voltage terminal.

16. The display device according to claim 14, wherein an nth stage of voltage supply circuit in the voltage supply module includes at least two thirteenth transistors and at least two nth stage of driving voltage output terminals, and the at least two thirteenth transistors and the pixel circuit are both arranged in a display area; a devices included in the nth stage of voltage supply circuit other than the thirteenth transistor are all arranged in a peripheral area; n is a positive integer;

the control electrode of the thirteenth transistor is electrically connected to a corresponding second node, the first electrode of the thirteenth transistor is electrically connected to a corresponding nth stage of driving voltage output terminal, and the second electrode of the thirteenth transistor is electrically connected to the initial voltage terminal;

each nth stage of driving voltage output terminal is electrically connected to the first end of the driving circuit included in at least one pixel circuit located in an nth row, and is configured to provide a corresponding nth stage of driving voltage to the first end of the driving circuit included in the at least one pixel circuit located in the nth row.

17. A voltage supply circuit, comprising a first node control circuit, a first control node control circuit, a second node control circuit and a driving voltage output circuit, wherein, the first node control circuit is electrically connected to a first node, an input terminal, a first clock signal terminal, a first control node, a first voltage terminal and a second voltage terminal, and is configured to control a potential of the first node according to a first voltage signal provided by the first voltage terminal and a second voltage signal provided by the second voltage terminal under the control of an input signal provided by the input terminal, a first clock signal provided by the first clock signal terminal and a potential of the first control node;

the first control node control circuit is electrically connected to the first control node, the input terminal and a second clock signal terminal respectively, is configured to control a potential of the first control node under the control of a second clock signal provided by the second clock signal terminal and the input signal;

the second node control circuit is electrically connected to a second node, the first control node, the first clock signal terminal, the first node and the second voltage terminal respectively, is configured to control a potential of the second node according to the first clock signal and the second voltage signal under the control of the potential of the first node, the potential of the first control node and the first clock signal;

the driving voltage output circuit is electrically connected to the second node, the driving voltage output terminal and the initial voltage terminal respectively, and is configured to control the driving voltage output terminal to output a driving voltage according to an initial voltage provided by the initial voltage terminal under the control of the potential of the second node;

wherein the first node control circuit includes a second control node control sub-circuit, a first node control sub-circuit and a first energy storage circuit;

the second control node control sub-circuit is electrically connected to the second control node, the input terminal and the first clock signal output terminal, and is configured to control to connect the second control node and the input terminal under the control of the first clock signal;

a first end of the first energy storage circuit is electrically connected to the second control node, a second end of the first energy storage circuit is electrically connected to the first node, and the first energy storage circuit is used for store electrical energy;

the first node control sub-circuit is electrically connected to the second control node, the first node, the first voltage terminal, the first clock signal terminal, the first control node and the second voltage terminal, respectively, is configured to control to connect the first node and the first voltage terminal under the control of the potential of the second control node, and control to connect the first node and the second voltage terminal under the control of the first clock signal and the potential of the first control node;

wherein the second control node control sub-circuit comprises a first transistor;

a control electrode of the first transistor is electrically connected to the first clock signal terminal, a first electrode of the first transistor is electrically connected to the input terminal, and a second electrode of the first transistor is electrically connected to the second control node;

the first energy storage circuit includes a first capacitor;

a first end of the first capacitor is electrically connected to the second control node, and a second end of the first capacitor is electrically connected to the first node;

the first node control sub-circuit includes a second transistor, a third transistor and a fourth transistor;

a control electrode of the second transistor is electrically connected to the second control node, a first electrode of the second transistor is electrically connected to the first voltage terminal, and a second electrode of the second transistor is electrically connected to the first node;

a control electrode of the third transistor is electrically connected to the first clock signal terminal, a first electrode of the third transistor is electrically connected to the first node, and a second electrode of the third transistor is electrically connected to a first electrode of the fourth transistor;

a control electrode of the fourth transistor is electrically connected to the first control node, and a second electrode of the fourth transistor is electrically connected to the second voltage terminal.

18. The voltage supply circuit according to claim 17, wherein the driving voltage output circuit is further electrically connected to the first node and the third voltage terminal, is configured to control the driving voltage output terminal to be electrically connected to the third voltage terminal under the control of the potential of the first node.

19. The voltage supply circuit according to claim 17, further comprising a carry signal output circuit; wherein the carry signal output circuit is respectively electrically connected to the carry signal output terminal, the first node, the second node, the first voltage terminal and the second voltage terminal, is configured to control the carry signal output terminal to output a carry signal according to the first voltage signal and the second voltage signal under the control of the potential of the first node and the potential of the second node.

20. The voltage supply circuit according to claim 17, wherein the first node control sub-circuit further comprises a fifth transistor;

the second electrode of the second transistor and the first electrode of the third transistor are electrically connected to the first node through the fifth transistor;

a control electrode of the fifth transistor is electrically connected to the first voltage terminal, a first electrode of the fifth transistor is electrically connected to the second electrode of the second transistor and the first electrode of the third transistor respectively, a second electrode of the fifth transistor is electrically connected to the first node.

* * * * *